(12) United States Patent
Ebisui et al.

(10) Patent No.: US 11,592,941 B2
(45) Date of Patent: Feb. 28, 2023

(54) INPUT APPARATUS AND ELECTRONIC EQUIPMENT

(71) Applicant: SONY CORPORATION, Tokyo (JP)

(72) Inventors: Akira Ebisui, Tokyo (JP); Ken Kobayashi, Tokyo (JP); Hayato Hasegawa, Tokyo (JP); Yoshiaki Sakakura, Tokyo (JP); Manami Miyawaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/040,515

(22) PCT Filed: Mar. 6, 2019

(86) PCT No.: PCT/JP2019/008820
§ 371 (c)(1),
(2) Date: Sep. 22, 2020

(87) PCT Pub. No.: WO2019/188066
PCT Pub. Date: Oct. 3, 2019

(65) Prior Publication Data
US 2021/0041973 A1 Feb. 11, 2021

(30) Foreign Application Priority Data
Mar. 30, 2018 (JP) .............................. JP2018-069339

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04105* (2013.01)

(58) Field of Classification Search
CPC ................ G06F 1/1626; G06F 1/1643; G06F 2203/04105; G06F 3/0412; G06F 3/044; G06F 3/0445; G06F 3/0447
See application file for complete search history.

(56) References Cited

U.S. PATENT DOCUMENTS

| 8,815,040 | B1 * | 8/2014 | Sloan .................... B44C 1/1712 156/235 |
| 2012/0068965 | A1 | 3/2012 | Wada et al. |

(Continued)

FOREIGN PATENT DOCUMENTS

| CN | 102446043 A | 5/2012 |
| JP | 2012-064108 A | 3/2012 |

(Continued)

OTHER PUBLICATIONS

International Search Report and Written Opinion of PCT Application No. PCT/JP2019/008820, dated May 14, 2019, 10 pages of ISRWO.

*Primary Examiner* — Hong Zhou
(74) *Attorney, Agent, or Firm* — Chip Law Group

(57) ABSTRACT

Electronic equipment includes a pressed body as either a housing or a display, a pressure-sensitive sensor, a support configured to support the pressure-sensitive sensor such that the pressure-sensitive sensor is opposed to the pressed body, and a filler provided between the pressed body and the pressure-sensitive sensor. The filler has a thickness that changes with distance between the pressed body and the pressure-sensitive sensor.

21 Claims, 20 Drawing Sheets

(56) References Cited

U.S. PATENT DOCUMENTS

| | | | |
|---|---|---|---|
| 2012/0105942 A1* | 5/2012 | Nakagawa | G02F 1/1675 |
| | | | 359/296 |
| 2013/0234734 A1* | 9/2013 | Iida | G01R 27/2605 |
| | | | 324/661 |
| 2015/0277626 A1* | 10/2015 | Shinkai | G06F 3/0447 |
| | | | 345/174 |
| 2016/0026297 A1* | 1/2016 | Shinkai | G06F 3/0447 |
| | | | 345/174 |
| 2016/0349123 A1 | 12/2016 | Martisauskas et al. | |
| 2016/0378223 A1* | 12/2016 | Hyuga | G06F 3/0445 |
| | | | 345/174 |
| 2017/0364189 A1 | 12/2017 | Arola et al. | |
| 2018/0039353 A1* | 2/2018 | Taka | G06F 1/1671 |
| 2018/0081466 A1* | 3/2018 | Moon | H01L 41/1132 |
| 2018/0088736 A1* | 3/2018 | Jeong | G06F 3/04144 |
| 2018/0143718 A1* | 5/2018 | Kim | G06F 3/0445 |

FOREIGN PATENT DOCUMENTS

| | | |
|---|---|---|
| KR | 10-2012-0029994 A | 3/2012 |
| WO | 2016/143241 A1 | 9/2016 |
| WO | 2016/191434 A1 | 12/2016 |
| WO | 2018/052096 A1 | 3/2018 |

\* cited by examiner

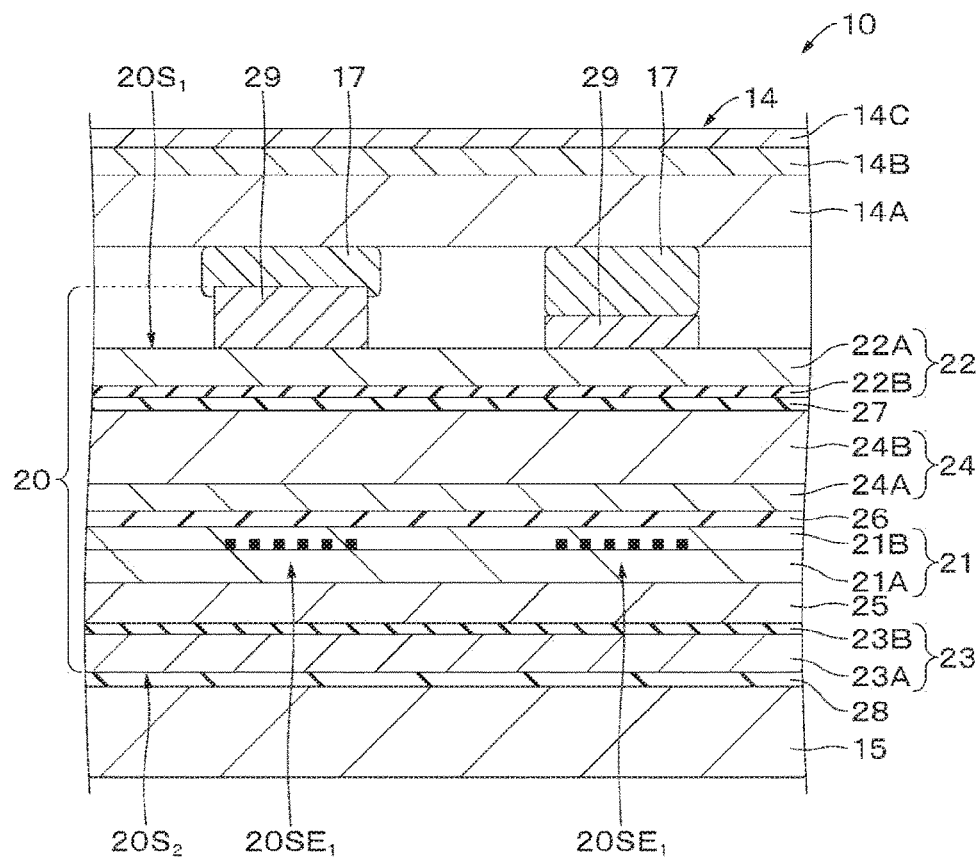
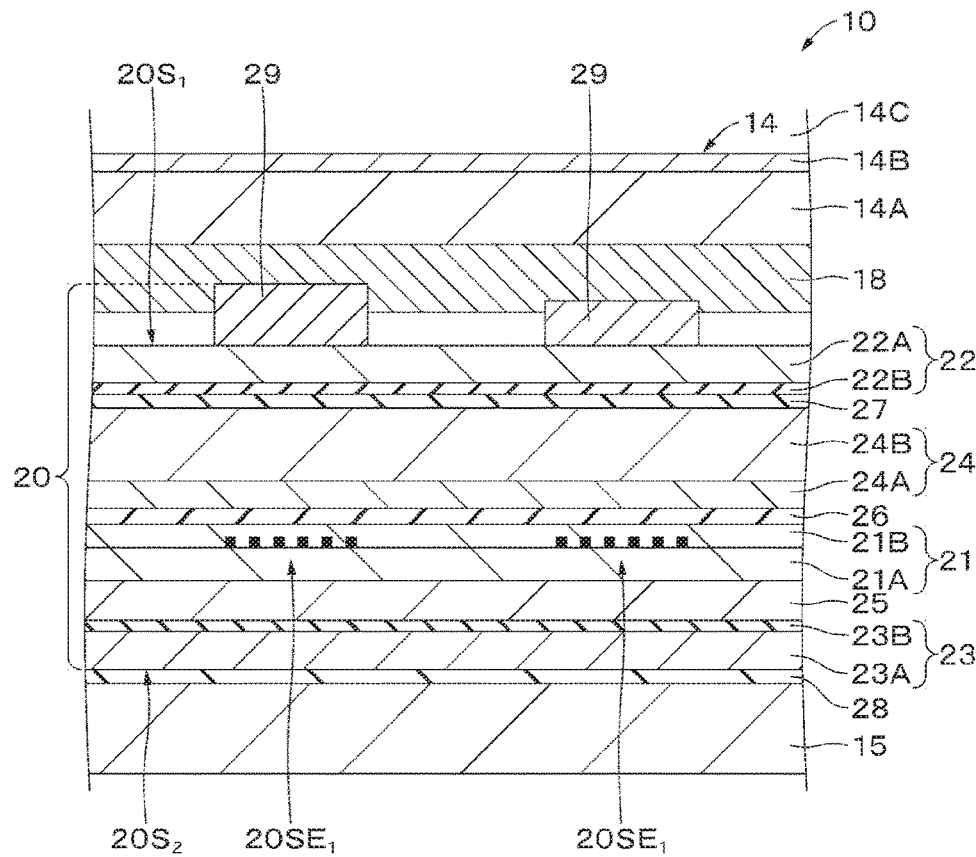

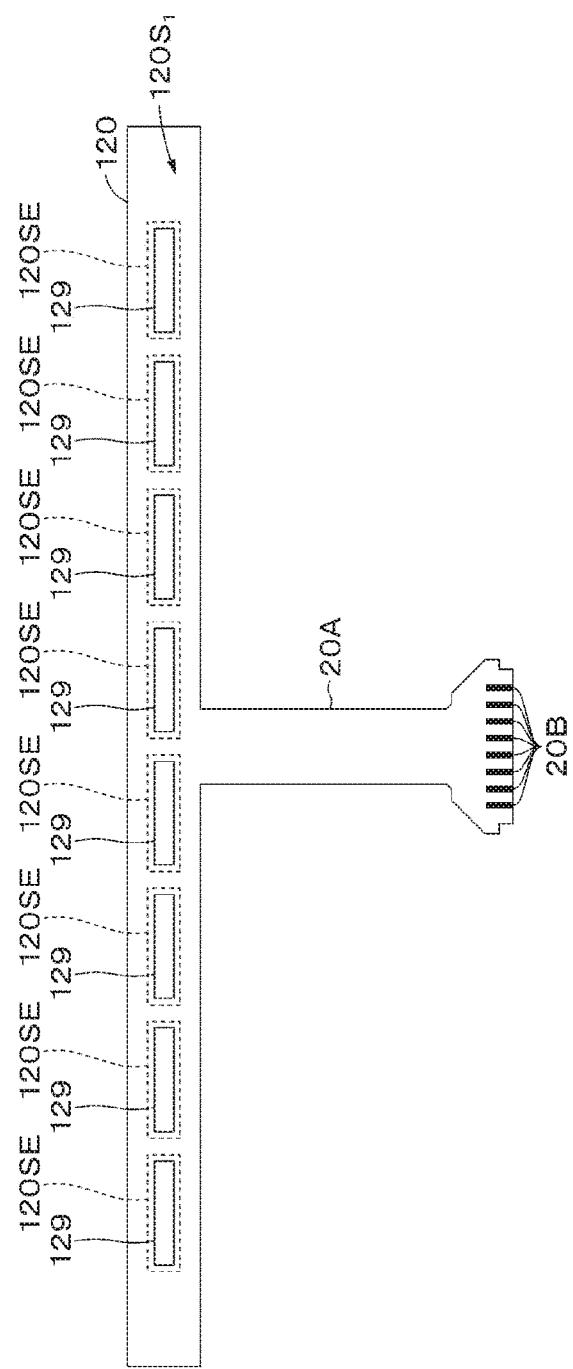

INPUT APPARATUS AND ELECTRONIC EQUIPMENT

CROSS REFERENCE TO RELATED APPLICATIONS

This application is a U.S. National Phase of International Patent Application No. PCT/JP2019/008820 filed on Mar. 6, 2019, which claims priority benefit of Japanese Patent Application No. JP 2018-069339 filed in the Japan Patent Office on Mar. 30, 2018. Each of the above-referenced applications is hereby incorporated herein by reference in its entirety.

TECHNICAL FIELD

The present disclosure relates to an input apparatus and electronic equipment.

BACKGROUND ART

Recent years have seen proposals of electronic equipment having a sensor in a film form on an inner side face of a housing or a rear face of a display and capable of detecting a pressure with which the housing or the display is pressed. Referring to PTL 1, providing a projecting portion on a sensing face of the sensor to provide improved pressing pressure sensitivity to such electronic equipment is described.

CITATION LIST

Patent Literature

[PTL 1]
Pamphlet of PCT Patent Publication No. WO2016/143241

SUMMARY

Technical Problems

Housings and displays commonly have deformation and a manufacturing error, and sensors themselves commonly vary in thickness. For this reason, a gap with a changing width is formed between the housing and the sensor or between the display and the sensor in the abovementioned electronic equipment. If such a gap is formed, there is a possibility that detection sensitivity may vary depending on where a pressing pressure is applied.

It is an object of the present disclosure to provide an input apparatus and electronic equipment that keep, to a minimum, variation in detection sensitivity depending on a pressing position.

Solution to Problems

In order to solve the above problems, a first disclosure is electronic equipment. The electronic equipment includes a pressed body as either a housing or a display, a pressure-sensitive sensor, a support configured to support the pressure-sensitive sensor such that the pressure-sensitive sensor is opposed to the pressed body, and a filler provided between the pressed body and the pressure-sensitive sensor. The filler has a thickness that changes with distance between the pressed body and the pressure-sensitive sensor.

A second disclosure is electronic equipment. The electronic equipment includes a pressed body as either a housing or a display, a pressure-sensitive sensor having a face opposed to the pressed body and plural projecting portions provided on the face, a support configured to support the pressure-sensitive sensor such that the pressure-sensitive sensor is opposed to the pressed body, and a filler provided between the pressed body and the plural projecting portions.

A third disclosure is an input apparatus. The input apparatus includes a pressed body as either a housing or a display, a pressure-sensitive sensor, a support configured to support the pressure-sensitive sensor such that the pressure-sensitive sensor is opposed to the pressed body, and a filler provided between the pressed body and the pressure-sensitive sensor. The filler has a thickness that changes with distance between the pressed body and the pressure-sensitive sensor.

A fourth disclosure is an input apparatus. The input apparatus includes a pressed body as either a housing or a display, a pressure-sensitive sensor having a face opposed to the pressed body and plural projecting portions provided on the face, a support configured to support the pressure-sensitive sensor such that the pressure-sensitive sensor is opposed to the pressed body, and a filler provided between the pressed body and the plural projecting portions.

Advantageous Effect of Invention

According to the present disclosure, it is possible to keep, to a minimum, variation in detection sensitivity depending on a pressing position. It should be noted that the advantageous effect described here is not limitative and may be any one of the advantageous effects described in the present disclosure or different therefrom.

BRIEF DESCRIPTION OF DRAWINGS

FIGS. 7A and 7B are each enlarged cross-sectional views of the region near the front panel.

FIG. 10 is a plan view of a sensor.

DESCRIPTION OF EMBODIMENTS

A description will be given of embodiments of the present disclosure in the following order. It should be noted that identical or corresponding components will be denoted by the same reference signs in all drawings of the following embodiments.

1 First embodiment (example of electronic equipment)
2 Second embodiment (example of electronic equipment)

1 First Embodiment

[Configuration of Electronic Equipment]

Figure 1A:
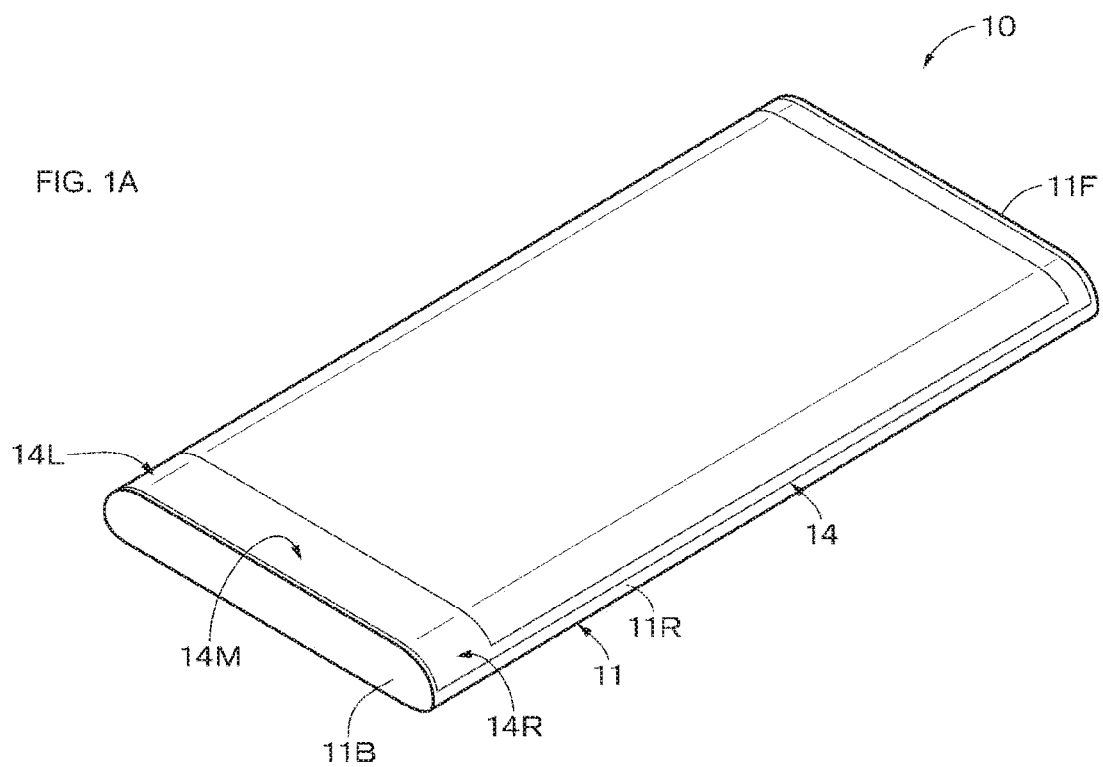
FIG. 1A is a perspective view of electronic equipment according to a first embodiment.
Figure 1B:
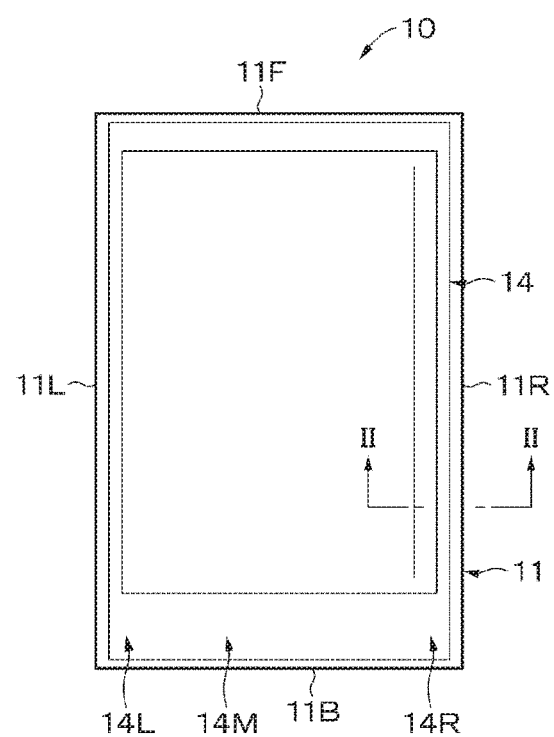
FIG. 1B is a plan view of the electronic equipment according to the first embodiment.
Figure 2:
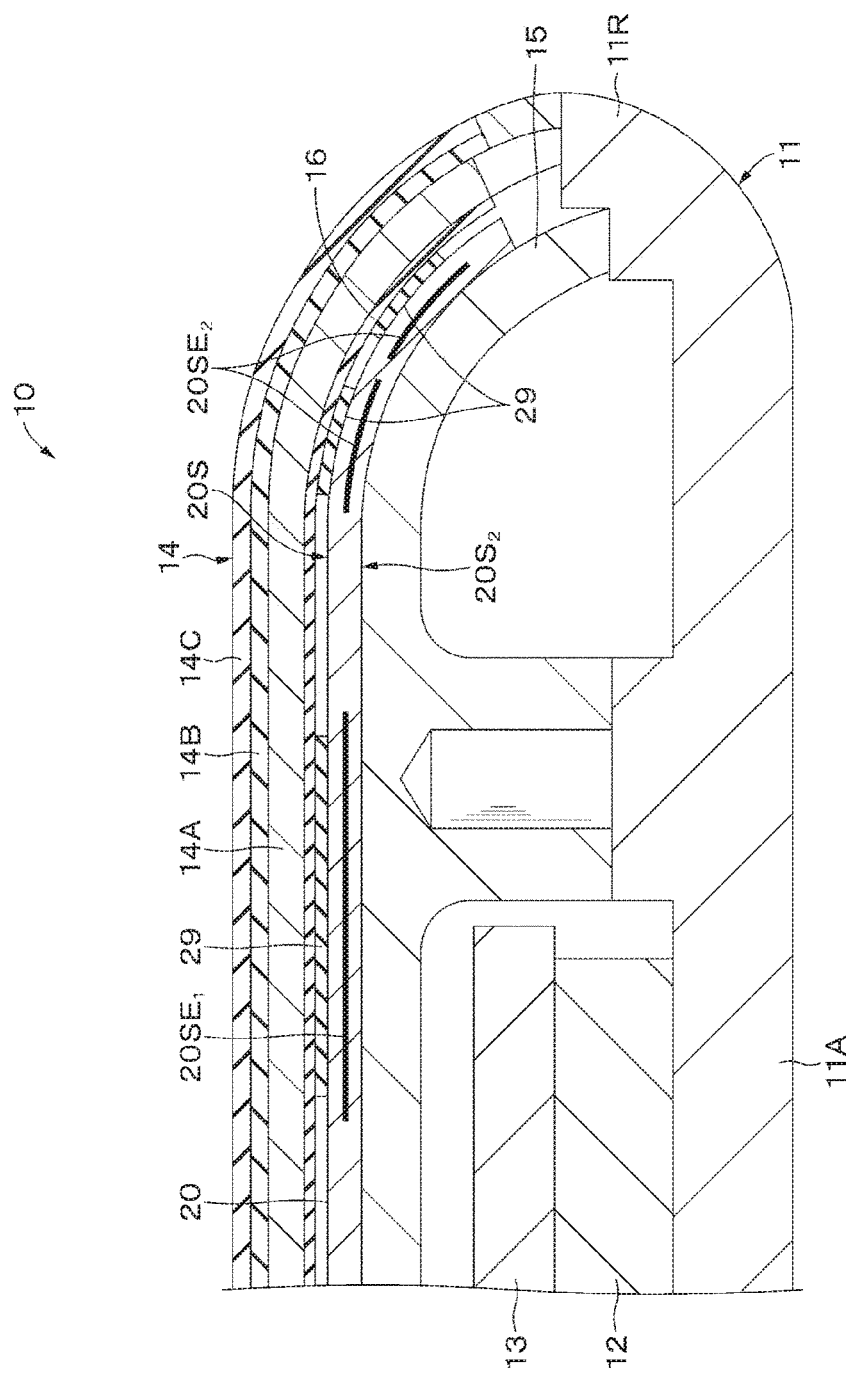
FIG. 2 is a cross-sectional view taken along line II-II in FIG. 1B.

A description will be given below of a configuration of electronic equipment 10 according to a first embodiment with reference to FIGS. 1A, 1B, and 2. The electronic equipment 10 is what is generally called a smartphone and includes a housing 11, a battery 12, a circuit board 13, and a front panel 14. The housing 11 is in the shape of a thin box with its one main face left open. The battery 12 and the circuit board 13 are accommodated in the housing 11. The front panel 14 is provided in such a manner as to cover the one open face of the housing 11. The electronic equipment 10 further includes a sensor 20, a support 15, and a filler 16. The sensor 20 is provided on a rear face of the front panel 14. The support 15 supports the sensor 20 such that the sensor 20 is opposed to the rear face of the front panel 14. The filler 16 is provided between the front panel 14 and the sensor 20. An input apparatus includes the front panel 14, the sensor 20, and the filler 16.

(Housing)

The housing 11 includes a bottom portion 11A, lateral wall portions 11R and 11L, and lateral wall portions 11F and 11B. The bottom portion 11A is in the shape of a rectangular plate included in the rear face of the electronic equipment 10. The lateral wall portions 11R and 11L are each provided along long sides of the bottom portion 11A. The lateral wall portions 11F and 11B are each provided along short sides of the bottom portion 11A. The lateral wall portions 11R and 11L are taller than the lateral wall portions 11F and 11B.

The housing 11 includes, for example, a metal, a polymeric resin, glass, or wood. Aluminum, titanium, zinc, nickel, magnesium, copper, and iron alone or alloys including a combination of two or more thereof are among examples of metals. However, the housing 11 is not limited thereto. Specific examples of alloys are stainless used steel (SUS), aluminum alloys, magnesium alloys, titanium alloys, and the like. Copolymer synthetic resin of acrylonitrile, butadiene, and styrene (ABS resin), polycarbonate (PC) resin, PC-ABS alloy resin, and the like are among examples of polymeric resins. However, polymeric resins are not limited thereto.

(Front Panel)

The front panel 14 is an example of a pressed body and is fitted between the lateral wall portions 11F and 11B. The front panel 14 is in the shape of a rectangular plate whose both long sides are bent in the form of an arch. More specifically, the front panel 14 has a flat portion 14M in the shape of a rectangular plate and bent portions 14R and 14L each extending from the both long sides of the flat portion 14M. The bent portions 14R and 14L are bent in such a manner as to protrude in the form of an arch on the side of the front face (display face) of the front panel 14. Tips of the bent portions 14R and 14L are respectively in contact with and joined to tips of the lateral wall portions 11R and 11L. It should be noted, however, that the configuration of the front panel 14 is not limited thereto, and waterproof tape or the like may be provided between the tip of the bent portion 14R and that of the lateral wall portion 11R and between the tip of the bent portion 14L and that of the lateral wall portion 11L, or a spacing (e.g., one of the order of several hundred microns) may be provided therebetween. Upper portions of the lateral wall portions 11F and 11B are at the same height as the front face of the front panel 14. The electronic equipment 10 can detect pressing pressures applied to the flat portion 14M and the bent portions 14R and 14L with the sensor 20.

The front panel 14 includes a display 14A, a capacitive touch panel 14B provided on a display face of the display 14A, and cover glass 14C provided on an input face (touch face) of the touch panel 14B.

The display 14A is an example of a pressed body and displays various types of screens and the like. A liquid crystal display, an electroluminescence (Electro Luminescence: EL) display, and the like are among examples of the display 14A. However, the display 14A is not limited thereto.

The touch panel 14B is designed to detect user's touch action. A surface or projection capacitive touch panel, for example, can be used as the touch panel 14B. However, the touch panel 14B is not limited thereto. Although both self-capacitive and mutual-capacitive panels can be used as a projection capacitive touch panel, a mutual-capacitive touch panel is preferred. The cover glass 14C is designed to protect the input face of the touch panel 14B.

The display 14A and the touch panel 14B are slightly smaller than the front panel 14 and in a shape similar to that of the front panel 14. That is, the display 14A and the touch panel 14B are in the shape of a rectangular plate whose both long sides are bent in the form of an arch.

(Support)

The support 15 has a supporting face for supporting the display 14A and the sensor 20. This supporting face is in a shape similar to that of the rear face of the front panel 14. The support 15 includes, for example, at least one type of polymeric resins or metals.

(Sensor)

Figure 3:
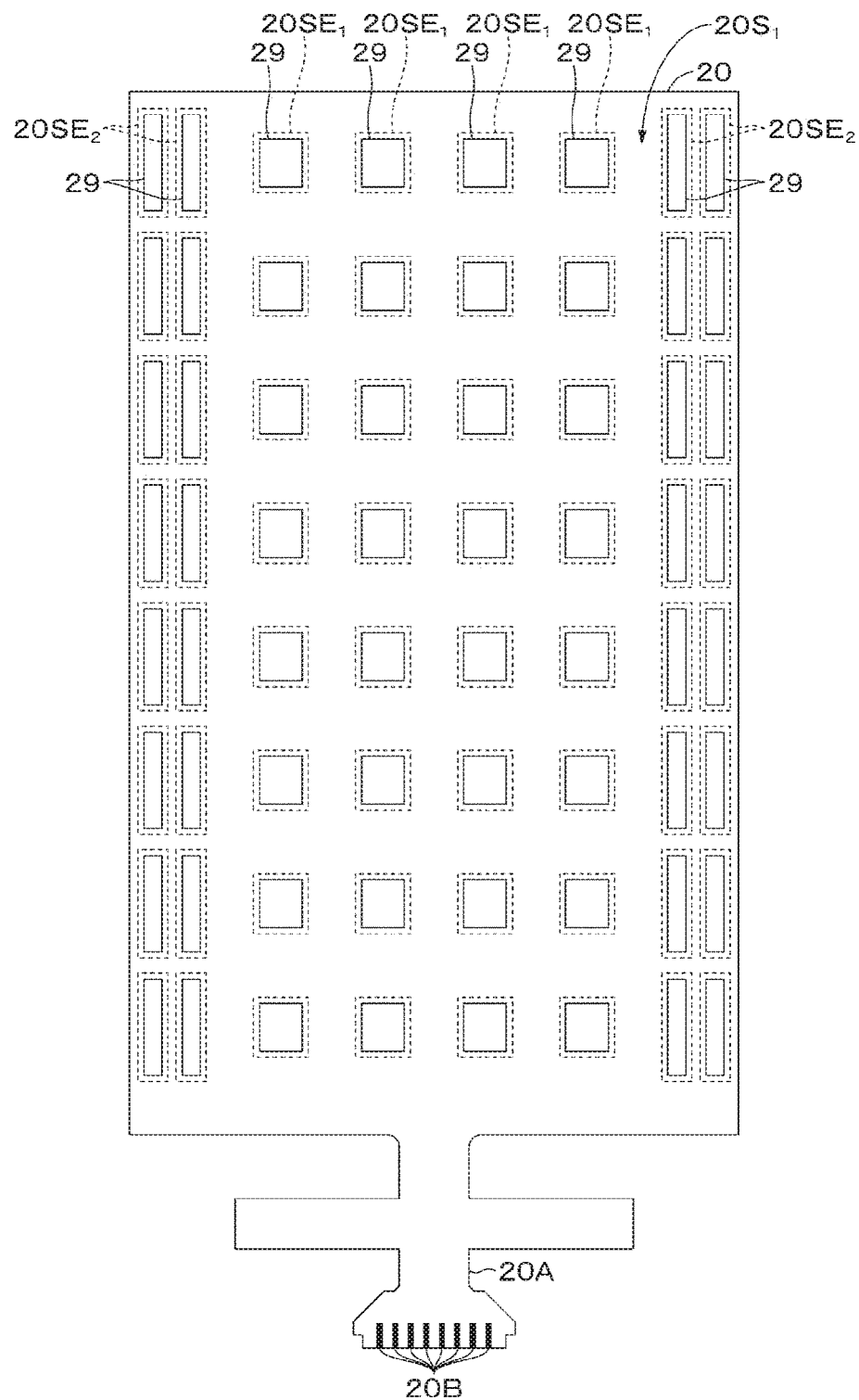
FIG. 3 is a plan view of a sensor.
Figure 4:
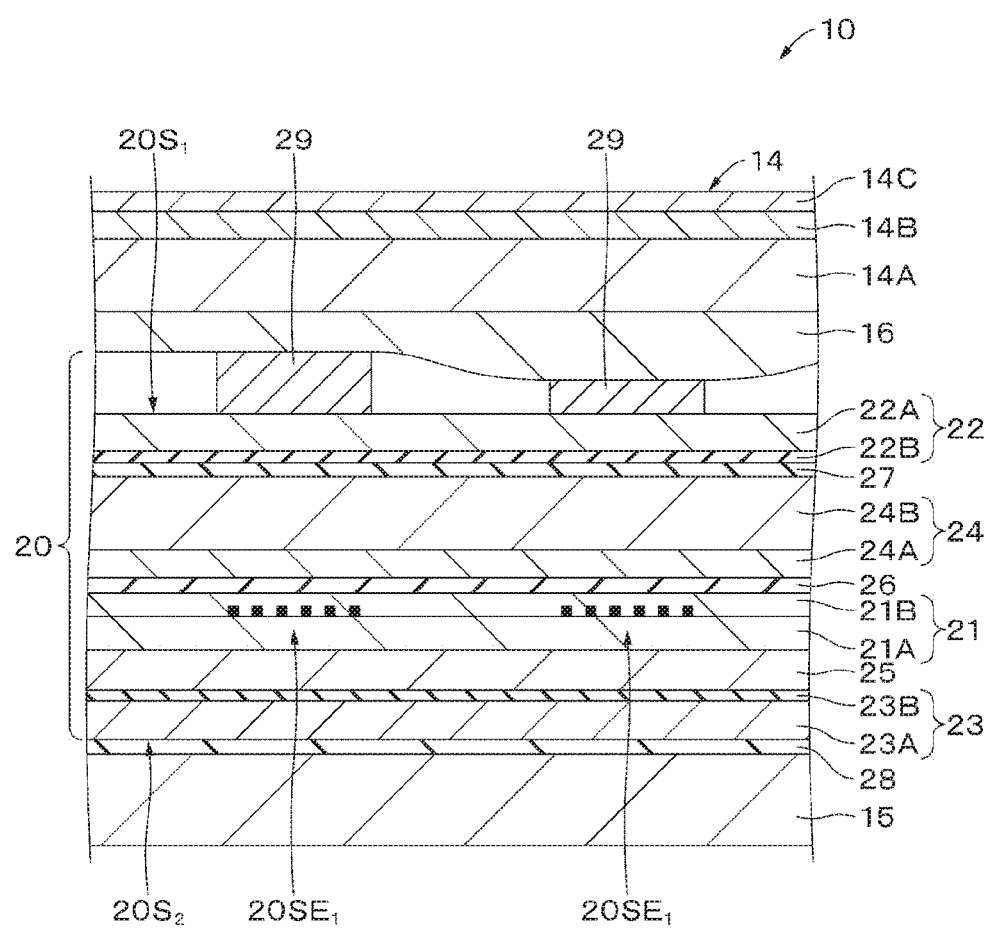
FIG. 4 is an enlarged cross-sectional view of a region near a front panel.

The sensor 20 is what is generally called a pressure-sensitive sensor and is in the form of a rectangular film as illustrated in FIG. 3. It should be noted that a film is defined in the present disclosure to include a sheet. The sensor 20 is nearly identical in size to the display 14A and provided between a rear face of the display 14A and the supporting face of the support 15 such that a first face $20S_1$ is opposed to the rear face of the display 14A and that a second face $20S_2$ is opposed to the supporting face of the support 15 as illustrated in FIG. 4. The sensor 20 detects a pressure with which the first face $20S_1$, i.e., the display face of the display 14A, is pressed.

A connection section 20A in a film form extends from a center of one short side of the sensor 20. Plural connection terminals 20B for connection to the circuit board 13 are provided at a tip of the connection section 20A. The connection terminals 20B are electrically connected to the circuit board 13.

The sensor 20 includes plural sensing sections $20SE_1$ and plural sensing sections $20SE_2$. The plural sensing sections $20SE_1$ are designed to detect a pressure with which the flat portion 14M is pressed, on the basis of a change in capacitance, and are provided in a region of the sensor 20 opposed to the flat portion 14M. The plural sensing sections $20SE_1$ are arranged in a matrix pattern. The sensing sections $20SE_1$ are, for example, square in shape. It should be noted, however, that the sensing sections $20SE_1$ are not specifically limited in shape and may be circular, elliptical, polygonal other than square, or the like.

The plural sensing sections $20SE_2$ are designed to detect a pressure with which the bent portions 14R and 14L are pressed, on the basis of a change in capacitance, and are provided in a region of the sensor 20 opposed to the bent portions 14R and 14L. The plural sensing sections $20SE_2$ are arranged in a matrix pattern. It should be noted that the plural sensing sections $20SE_2$ may be arranged in a single line toward a length direction of the bent portion 14R. The sensing sections $20SE_2$ are, for example, rectangular in shape. It should be noted, however, that the sensing sections $20SE_2$ are not specifically limited in shape and may be circular, elliptical, polygonal other than rectangular, or the like.

Plural projecting portions 29 are provided on the first face $20S_1$ of the sensor 20. The plural projecting portions 29 are each provided at a position corresponding to one of the plural sensing sections $20SE_1$ and the plural sensing sections $20SE_2$. More specifically, the plural projecting portions 29 are each provided in such a manner as to overlap one of the plural sensing sections $20SE_1$ and the plural sensing sections $20SE_2$ in a thickness direction of the sensor 20. As the plural projecting portions 29 are arranged in such a manner, when the display 14A is pressed, it is possible to have a pressing pressure concentrated on a portion of an electrode base material 22 corresponding to the sensing section $20SE_1$ or $20SE_2$. This makes it possible to improve detection sensitivity of the display 14A for the pressing pressure. The projecting portions 29 preferably have a higher elastic modulus than an elastic layer 24B. The reason for this is that the detection sensitivity of the display 14A for the pressing pressure can be further improved.

The projecting portion 29 is formed, for example, by printing a resin material or sticking single- or double-sided adhesive film, or the like to the first face $20S_1$ of the sensor 20.

The sensor 20 includes a capacitive sensor electrode layer 21, electrode base materials 22 and 23, a support-equipped elastic layer 24, a gap layer 25, and adhesion layers 26 and 27, as illustrated in FIG. 4. The second face $20S_2$ of the sensor 20 is stuck to the supporting face of the support 15 by an adhesion layer 28.

The sensor electrode layer 21 and the electrode base material 22 are arranged such that main faces thereof are opposed to each other. The support-equipped elastic layer 24 is provided between the main faces of the sensor electrode layer 21 and the electrode base material 22. The sensor electrode layer 21 and the support-equipped elastic layer 24 are stuck together by the adhesion layer 26, whereas the electrode base materials 22 and the support-equipped elastic layer 24 are stuck together by the adhesion layer 27.

The sensor electrode layer 21 and the electrode base material 23 are arranged such that main faces thereof are opposed to each other. The gap layer 25 is provided between the main faces of the sensor electrode layer 21 and the electrode base material 23.

(Sensor Electrode Layer)

The sensor electrode layer 21 includes a flexible base material 21A in a film form, the plural sensing sections $20SE_1$ and $20SE_2$ provided on one main face of the base material 21A, and a protective layer 21B that covers the one main face on which the sensing sections $20SE_1$ and $20SE_2$ are provided.

The base material 21A includes a polymeric resin and is flexible. Polyethylene terephthalate (PET), polyethylene naphthalate (PEN), polycarbonate (PC), acrylic resin (PMMA), polyimide (PI), triacetylcellulose (TAC), polyester, polyamide (PA), aramid, polyethylene (PE), polyacrylate, polyethersulfone, polysulfone, polypropylene (PP), diacetyl cellulose, polyvinyl chloride, epoxy resin, urea resin, urethane resin, melamine resin, cyclic olefin polymer (COP), and norbornene-based thermoplastic resin are among examples of polymeric resins. However, the base material 21A is not limited to these polymeric resins.

The sensing section $20SE_1$ detects capacitance corresponding to the distance between the sensing section $20SE_1$ and the electrode base material 22. Also, the sensing section $20SE_2$ detects capacitance corresponding to the distance between the sensing section $20SE_2$ and the electrode base material 22.

Figure 5:
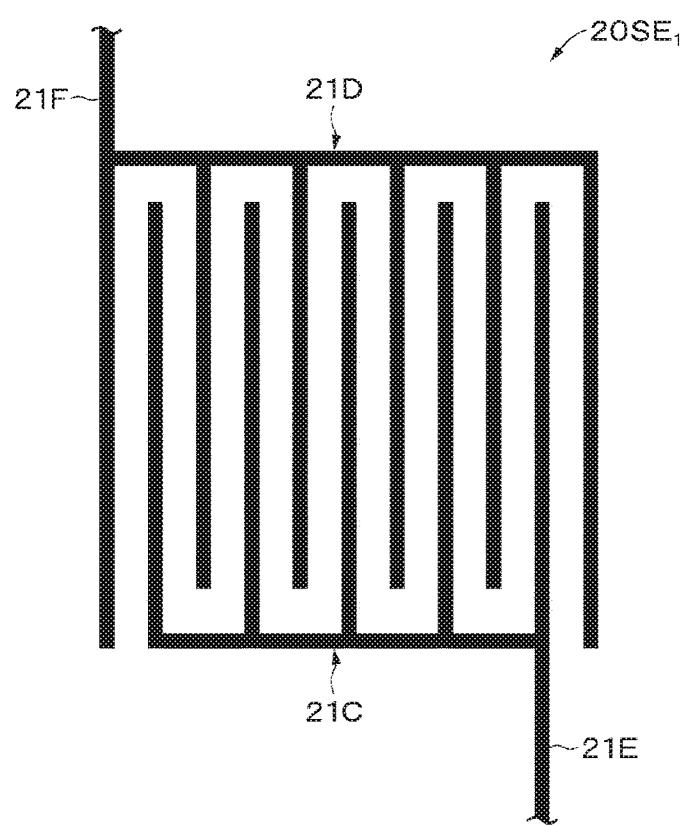
FIG. 5 is a plan view of a sensing section.

The sensing section $20SE_1$ includes a pulse electrode (first electrode) 21C and a sensing electrode (second electrode) 21D as illustrated in FIG. 5. The pulse electrode 21C and the sensing electrode 21D can form a capacitive coupling. More specifically, the pulse electrode 21C and the sensing electrode 21D are in the shape of a comb and are arranged such that their teeth portions mesh with each other. The sensing section $20SE_2$ has a configuration similar to that of the sensing section $20SE_1$.

A wire 21E is pulled out of the pulse electrode 21C, guided around a rim portion of one main face of the base material 21A, and connected to the connection terminal 20B through the connection section 20A. A wire 21F is pulled out of the sensing electrode 21D, guided around a rim portion of one main face of the base material 21A, and connected to the connection terminal 20B through the connection section 20A.

The protective layer 21B is designed to protect the sensing sections $20SE_1$ and $20SE_2$. The protective layer 21B is, for example, an insulating film such as a coverlay film or an insulating resist material. It should be noted that the sensor 20 may not have the protective layer 21B and that the adhesion layer 26 may be provided directly on the one main face of the base material 21A where the sensing sections $20SE_1$ and $20SE_2$ are provided.

The sensor electrode layer 21 and the connection section 20A are preferably formed integrally by a single flexible printed circuit (FlexiLe Printed Circuits (hereinafter referred to as an "FPC")). The integral formation of the sensor electrode layer 21 and the connection section 20A in such a manner provides a reduced number of components of the sensor 20. It is also possible to ensure improved shock resistance of connection between the sensor 20 and the circuit board 13.

(Electrode Base Material)

The electrode base materials 22 and 23 are flexible electrode films. The electrode base material 22 is included in the first face $20S_1$ of the sensor 20, and the electrode base material 23 is included in the second face $20S_2$ of the sensor 20. The electrode base material 22 includes a flexible base material 22A and a reference electrode layer (hereinafter referred to as an "REF electrode layer") 22B provided on one main face of the flexible base material 22A. The electrode base material 22 is provided on the side of the one main face of the sensor electrode layer 21 such that the REF electrode layer 22B is opposed to the one main face of the sensor electrode layer 21. The electrode base material 23 includes a flexible base material 23A and an REF electrode layer 23B provided on one main face of the base material 23A. The electrode base material 23 is arranged on the side of the other main face of the sensor electrode layer 21 such that the REF electrode layer 23B is opposed to the other main face of the sensor electrode layer 21.

The base materials 22A and 23A are in a film form. Polymeric resins similar to those of the base material 21A are among examples of the material of the base materials 22A and 23A. The REF electrode layers 22B and 23B are what are generally called grounding electrodes and are at a ground potential. As for the shape, the REF electrode layers 22B and 23B are, for example, in a thin film form, foil form, mesh form, or the like. However, the REF electrode layers 22B and 23B are not limited to these shapes.

The REF electrode layers 22B and 23B are only required to be electrically conductive. For example, the REF electrode layers 22B and 23B are inorganic conductive layers including an inorganic-based conductive material, organic conductive layers including an organic-based conductive material, or organic-inorganic conductive layers including both an inorganic-based conductive material and an organic-based conductive material. Inorganic- and organic-based conductive materials may be particles.

Metals, metal oxides, and the like are among examples of inorganic-based conductive materials. Here, metals are defined to include a metalloid. Metals such as aluminum, copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, alloys including two or more of these metals, and the like are among examples of metals. However, metals are not limited thereto. Although stainless used steel is a specific example of an alloy, alloys are not limited thereto. Indium-tin oxide (ITO), zinc oxide, indium oxide, antimony-added tin oxide, fluorine-added tin oxide, aluminum-added zinc oxide, gallium-added zinc oxide, silicon-added zinc oxide, zinc-oxide-tin-oxide-based materials, indium-oxide-tin-oxide-based materials, zinc-oxide-indium-oxide-magnesium-oxide-based materials, and the like are among examples of metal oxides. However, metal oxides are not limited thereto.

Carbon materials, conductive polymers, and the like are examples of the organic conductive materials. Although carbon black, carbon fiber, fullerene, graphene, carbon nanotube, carbon microcoil, nanohorn, and the like are examples of carbon materials, carbon materials are not limited thereto. Although substituted or non-substituted polyaniline, polypyrrole, polythiophene, and the like are among examples of conductive polymers, conductive polymers are not limited thereto.

The REF electrode layers 22B and 23B may be thin films manufactured by a dry or wet process. Although sputtering, vacuum deposition, or the like is used, for example, as a dry process, the dry process is particularly not limited thereto.

Because the electrode base materials 22 and 23 are provided on both sides of the main faces of the sensor electrode layer 21, it is possible to keep, to a minimum, entry of external noise (external electric field) into the sensor electrode layer 21 from both sides of the main faces of the sensor 20. This keeps, to a minimum, possible decline in detection accuracy or erroneous detection of the sensor 20 due to external noise.

(Support-Equipped Elastic Layer 24)

The support-equipped elastic layer 24 includes a support 24A and an elastic layer 24B provided on top of the support 24A. The elastic layer 24B can elastically deform in response to a pressure applied to the first face $20S_1$. Because the elastic layer 24B is sandwiched between the sensor electrode layer 21 and the electrode base material 22, it is possible to adjust the sensitivity and dynamic range of the sensor 20.

The support 24A is designed to support the elastic layer 24B. It should be noted that the support 24A may be provided as necessary and may not be provided. The support 24A is in a film form. Polymeric resins similar to those of the base material 21A are among examples of the material of the support 24A.

The support-equipped elastic layer 24 preferably has space portions (not depicted) that penetrate the support-equipped elastic layer 24 in the thickness direction. In this case, the sensitivity of the sensor 20 can be improved. The space portions preferably have a shape pattern. The space portions may be provided regularly in an in-plane direction of the sensor 20 or provided in a random pattern. Although stripe, mesh, radial, geometric pattern, meander, concentric, spiral, web-like, tree-like, fishbone, ring, lattice, irregular shapes, and the like are among examples of specific shapes of the space portions, the space portions are not limited thereto. The space portions are preferably provided at positions corresponding to the sensing sections $20SE_1$ and $20SE_2$ (specifically, at positions on top of the sensing sections $20SE_1$ and $20SE_2$). The reason for this is that, when the display 14A is pressed, the portions of the electrode base material 22 corresponding to the sensing sections $20SE_1$ and $20SE_2$ deform more easily toward the sensor electrode layer 21, thus providing improved sensitivity of the sensor 20.

Also, the support-equipped elastic layer 24 may be plural columnar bodies. In this case, the sensitivity of the sensor 20 can be improved. The plural columnar bodies may be formed, for example, by patterning a double-sided tape. The plural columnar bodies are preferably provided to surround the sensing sections $20SE_1$ and $20SE_2$. The reason for this is that, when the display 14A is pressed, the portions of the electrode base material 22 corresponding to the sensing sections $20SE_1$ and $20SE_2$ deform more easily toward the sensor electrode layer 21, thus providing more improved sensitivity of the sensor 20.

The elastic layer 24B includes a foam resin, an insulating elastomer, or the like. Foam resin is what is generally called a sponge and is at least one of foam polyurethane (polyurethane foam), foam polyethylene (polyethylene foam), foam polyolefin (polyolefin foam), foam acryl (acryl foam), sponge rubber, and the like. Insulating elastomer is at least one of silicon-based elastomer, acrylic-based elastomer, urethane-based elastomer, styrene-based elastomer, or the like.

The elastic layer 24B is preferably 0.04 MPa or less in elastic modulus. If the elastic modulus of the elastic layer 24B is 0.04 MPa or less, the sensitivity of the sensor 20 can be further improved. The elastic modulus (25% CLD) is measured pursuant to JIS K 6254.

The elastic layer 24B is preferably 10 to 1000 μm in thickness. If the thickness of the elastic layer 24B is 10 μm or more, it is possible to keep, to a minimum, excessive increase in the sensitivity of the sensor 20. This keeps, to a minimum, malfunction of the electronic equipment 10 attributable to unintended pressing of the display 14A. Meanwhile, if the thickness of the elastic layer 24B is 1000 μm or less, the sensitivity of the sensor 20 can be further improved.

The thickness of the elastic layer 24B can be obtained as follows. First, a cross section is prepared by processing the sensor 20 by FIB (Focused Ion Beam) or other technique, followed by capturing a cross-sectional image (hereinafter referred to as a "cross-sectional SEM image") with a scanning electron microscope (SEM). Next, a point is randomly selected from the elastic layer 24B in this cross-sectional SEM image for measurement of the thickness of the elastic layer 24B at that point.

The elastic layer 24B preferably has an area occupancy of 10% to 100%. If the area occupancy of the elastic layer 24B is 10% or more, it is possible to keep, to a minimum, excessive increase in the sensitivity of the sensor 20. This keeps, to a minimum, malfunction of the electronic equipment 10 attributable to unintended pressing of the display 14A. Here, the term "area occupancy of the elastic layer 24B" refers to the ratio of an area S2 of the elastic layer 24B to an area S1 of the first face $20S_1$ ((S2/S1)×100).

(Gap Layer)

The gap layer 25 is insulating and separates the electrode base material 23 and the sensor electrode layer 21, and the initial capacitance of the sensor 20 is regulated by the thickness of the gap layer 25. The gap layer 25 may be able to elastically deform in response to the pressure applied to the first face $20S_1$ or may not be formed to be elastically deformable.

The gap layer 25 may or may not be adhesive. In the case where the gap layer 25 is adhesive, the electrode base material 23 and the sensor electrode layer 21 are stuck together by the gap layer 25. For example, the adhesive gap layer 25 includes, for example, a single adhesion layer or a laminate (e.g., double-sided adhesive film) having a base material and adhesion layers each on one face of the base material.

At least one of acrylic-based adhesives, silicon-based adhesives, or urethane-based adhesives can be used as an adhesive included in the adhesion layer. It should be noted that pressure sensitive adhesion is defined as a type of adhesion in the present disclosure. According to this definition, a pressure sensitive adhesion layer is regarded as a type of adhesion layer.

In the case where the gap layer 25 can elastically deform, the gap layer 25 may include a foam resin, an insulating elastomer, or the like. In this case, the gap layer 25 and the electrode base material 23 may be stuck together by an adhesion layer (not depicted). Also, the gap layer 25 and the sensor electrode layer 21 may be stuck together by an adhesion layer (not depicted).

(Adhesion Layers)

The adhesion layers 26 to 28 include, for example, an insulating adhesive or double-sided adhesive film. The adhesives similar to those used for the gap layer 25 are among examples of adhesives.

(Filler)

The filler 16 is designed to fill gaps between the rear face of the display 14A and the plural projecting portions 29. The filler 16 is in a rectangular film form. The thickness of the filler 16 changes with the distance (gap width) between the rear face of the display 14A and the plural projecting portions 29.

The filler 16 includes a foaming agent that foams under heat. By including such a foaming agent in the filler 16, it is possible to fill the gaps between the rear face of the display 14A and the plural projecting portions 29 by sandwiching the filler 16 between the rear face of the display 14A and the plural projecting portions 29 and causing the filler 16 to foam through heating. This makes it possible to easily fill the gaps between the rear face of the display 14A and the plural projecting portions 29. Although at least one of polyurethane foam, polystyrene foam, or polypropylene foam can be used as a foaming agent, the foaming agent is not limited thereto.

The filler 16 preferably further includes an antifoaming agent. The reason for this is that, by including an antifoaming agent in the filler 16, it is possible to keep, to a minimum, crushing of the elastic layer 24B attributable to excessive foaming of the filler 16 during heating of the filler 16. This keeps, to a minimum, decline in sensitivity of the sensor 20. The inclusion of an antifoaming agent in the filler 16 can be confirmed, for example, by evaluating a molecular weight by GPC (Gel Permeation Chromatography) or the like or analyzing a composition by FTIR (Fourier Transform Infrared Spectroscopy) or the like.

The elastic layer 24B is preferably smaller in elastic modulus than the filler 16. If the elastic layer 24B is smaller in elastic modulus than the filler 16, it is possible to keep, to a minimum, crushing of the filler 16 preferentially to the elastic layer 24B when the display 14A is pressed. This keeps, to a minimum, decline in sensitivity attributable to the provision of the filler 16 between the display 14A and the plural projecting portions 29.

There is preferably no gap or nearly no gap between the filler 16 and the display 14A and between the filler 16 and the projecting portions 29 on the sensing sections $20SE_1$ and $20SE_2$. Here, the term "nearly no gap" refers to a condition in which the widths of the gap between the filler 16 and the display 14A and that between the filler 16 and the projecting portions 29 on the sensing sections $20SE_1$ and $20SE_2$ are 1 µm or less.

[How to Fill Gaps with Filler]

A description will be given below of how to fill the gaps between the rear face of the display 14A and the plural projecting portions 29 with the filler 16. First, a sheet of the filler 16 in a film form is provided between the rear face of the display 14A and the plural projecting portions 29. Next, the filler 16 is caused to foam through heating, thus inflating the filler 16 in the direction of its thickness. This fills the gap between the filler 16 and the front panel 14 and that between the filler 16 and the projecting portions 29.

[Configuration of Circuit Board]

Figure 6:
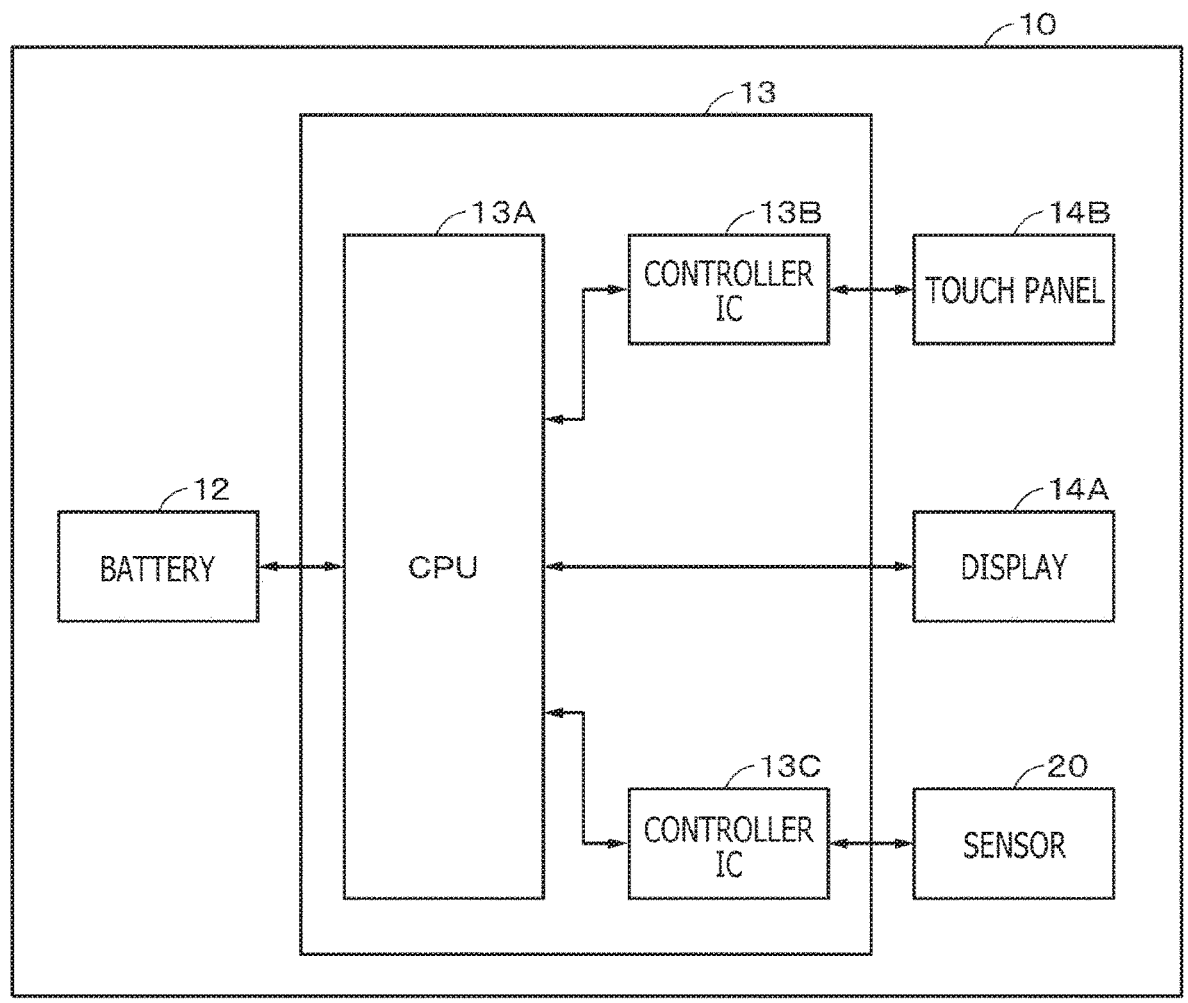
FIG. 6 is a block diagram of the electronic equipment according to the first embodiment.

The circuit board 13 includes a CPU 13A and controller ICs 13B and 13C as illustrated in FIG. 6. The controller ICs 13B and 13C are connected to the CPU 13A. Also, the battery 12 and the display 14A are connected to the CPU 13A. The touch panel 14B is connected to the controller IC 13B, and the sensor 20 is connected to the controller IC 13C.

The controller IC 13B detects the change in capacitance according to a touch action on the touch panel 14B, outputting an output signal corresponding thereto to the CPU 13A. The controller IC 13C detects the capacitance corresponding to the pressing pressure with which the display 14A, i.e., the first face $20S_1$ of the sensor 20, is pressed, outputting an output signal corresponding thereto to the CPU 13A. More specifically, the controller IC 13C stores firmware for controlling the sensor 20 and detects the change in capacitance (pressure) of each of the sensing sections 20SE of the sensor 20, outputting a signal corresponding to the result to the CPU 13A.

The CPU 13A performs various processing tasks on the basis of signals supplied from the ICs 13B and 13C. The display 14A displays various screens on the basis of signals supplied from the CPU 13A. The battery 12 supplies power to the CPU 13A, the controller ICs 13B and 13C, the display 14A, and the like. The battery 12 is, for example, a secondary cell such as lithium ion secondary cell.

[Operation of Electronic Equipment]

A description will be given below of operation of the electronic equipment 10 according to the first embodiment. When the controller IC 13C applies a voltage between the pulse electrode 21C and the sensing electrode 21D, electric force lines (capacitive coupling) are formed between the pulse electrode 21C and the sensing electrode 21D.

When pressed, the display 14A warps, thus pressing the first face $20S_1$ of the sensor 20 via the filler 16 and the projecting portions 29. The elastic layer 24B elastically deforms as a result of pressing of the first face $20S_1$, thus warping the electrode base material 22 toward the sensor electrode layer 21. This brings the electrode base material 22 and the sensor electrode layer 21 closer to each other, causing some of the electric force lines between the pulse electrode 21C and the sensing electrode 21D to flow to the electrode base material 22 and changing the capacitance of the sensing sections 20SE. The controller IC 13C detects the pressure applied to the one main face of the base material 21A, on the basis of this change in capacitance, outputting the result thereof to the CPU 13A. The CPU 13A performs various processing tasks on the basis of the detection result supplied from the controller IC 13C.

It should be noted that, in the case where the gap layer 25 can elastically deform in response to a pressure applied to the first face $20S_1$, the sensor 20 operates as follows. That is, the elastic layer 24B elastically deforms in response to a pressure with which the first face $20S_1$ of the sensor 20 is pressed, warping the electrode base material 22 toward the sensor electrode layer 21, elastically deforming the gap layer 25, and warping the sensor electrode layer 21 toward the electrode base material 22. This brings not only the electrode base material 22 and the sensor electrode layer 21 closer to each other but also the sensor electrode layer 21 and the electrode base material 23 closer to each other, causing some of the electric force lines between the pulse electrode 21C and the sensing electrode 21D to flow to the electrode base materials 22 and 23 and changing the capacitance of the sensing sections 20SE.

[Advantageous Effect]

The electronic equipment 10 according to the first embodiment described above includes the front panel 14, the sensor 20, the support 15, and the filler 16. The sensor 20 has the first face $20S_1$ opposed to the rear face of the front panel 14, with the plural projecting portions 29 provided on the first face $20S_1$. The support 15 supports the sensor 20 such that the sensor 20 is opposed to the rear face of the front panel 14. The filler 16 in a film form fills the gaps between the rear face of the front panel 14 and the plural projecting portions 29. This keeps, to a minimum, formation of gaps between the rear face of the front panel 14 and the plural projecting portions 29. Therefore, it is possible to keep, to a minimum, variation in in-plane sensitivity of the sensor 20.

Modification Examples

Modification Example of Elastic Layer

The elastic layer 24B may be porous. The porous layer is preferably a fiber layer. The fiber layer is, for example, nonwoven or woven fabric. The fiber included in the fiber layer may be a nanofiber or a fiber thicker than a nanofiber. From the viewpoint of improving the sensitivity of the sensor 20, however, the fiber is preferably a nanofiber. The fiber may include a polymeric resin or an inorganic material. From the viewpoint of improving the sensitivity of the sensor 20, however, the fiber preferably includes a polymeric resin.

The porous layer may include a three-dimensional stereoscopic structure formed by a fibrous structure (irregular network structure such as unwoven fabric) and have plural gaps (thin holes). The inclusion of a three-dimensional stereoscopic structure in the porous layer makes it possible to create a structure with a high porosity and makes it easy to achieve reduction in film thickness.

The fibrous structure is a fibrous substance having a sufficient length relative to a fiber diameter (diameter). For example, plural fibrous structures assemble together and overlap each other randomly, thus forming a porous layer. A single fibrous structure may form a porous layer by intertwining randomly with itself. Alternatively, one porous layer formed by a single fibrous structure and another one formed by plural fibrous structures may coexist.

The fibrous structure extends, for example, linearly. The fibrous structure may be in any shape and may be, for example, curled or bent halfway along its length. Alternatively, the fibrous structure may branch out halfway along its length.

The minimum fiber diameter of the fibrous structure is preferably 500 nm or less and more preferably 300 nm or less. Although preferably, for example, 0.1 to 10 μm, the mean fiber diameter may fall outside the above range. The smaller the mean fiber diameter, the larger the diameter of the thin holes. The mean fiber diameter can be measured, for example, through microscopic observation using a scanning electron microscope. The fibrous structure may have any mean length. The fibrous structure is formed, for example, by a phase separation method, a phase inversion method, an electrostatic (electric field) spinning method, a melt spinning method, a wet spinning method, a dry spinning method, a gel spinning method, a sol-gel method, a spray coating method, or the like. It is possible to form a fibrous structure having a sufficient length relative to the fiber diameter readily and stably by using one of these methods.

The fibrous structure preferably includes at least either a polymeric material or an inorganic material and particularly preferably includes a nanofiber. Here, the term "nanofiber" refers to a fibrous substance having a fiber diameter of 1 to 1000 nm and a length 100 times or more the fiber diameter. It is possible to provide high porosity and achieve reduction in film thickness by using such a nanofiber as a fibrous structure. The fibrous structure including a nanofiber is preferably formed by the electrostatic spinning method. It is possible to form a fibrous structure having a small fiber diameter readily and stably by using the electrostatic spinning method.

Modification Example of Adhesion Layer

The adhesion layer 27 may be conductive. In this case, the sensitivity of the sensor 20 can be further improved. The conductive adhesion layer 27 further includes a conductive material in addition to an adhesive. The conductive material is, for example, at least one of a conductive filler or a conductive polymer. The conductive filler includes, for example, at least one of a carbon-based filler, a metal-based filler, a metal oxide-based filler, or a metal coating-based filler. Here, metals are defined to include metalloids.

Modification Example 1 of Filler

The electronic equipment 10 may include the plural fillers 16 each provided independently of the other fillers 16 between the rear face of the display 14A and one of the plural projecting portions 29, in place of the filler 16 in a film form. The plural fillers 16 are provided to correspond to the plural sensing sections $20SE_1$ and $20SE_2$. That is, the plural sensing sections $20SE_1$ and $20SE_2$ are arranged in a dot (matrix) pattern. The fillers 17 are designed to fill the gaps between the rear face of the display 14A and the plural projecting portions 29. The fillers 17 vary in thickness depending on the distance between the rear face of the display 14A and the projecting portion 29.

The filler 17 includes an ultraviolet radiation curing resin, a thermal curing resin, or a cured product of a hot melt adhesive. The ultraviolet radiation curing resin is preferably one that cures after a given period of time elapses (hereinafter referred to as a "time-lagged ultraviolet radiation curing resin"). The ultraviolet radiation curing resin includes at least one of urethane acrylate, acryl resin acrylate, epoxy acrylate, or the like.

The thermal curing resin includes at least one of urea-based, melamine-based, phenol-based, epoxy-based, polyurethane-based, polyester-based, polyimide-based, polyaromatic-based, or resorcinol-based thermal curing resins. The hot melt includes at least one of ethylene-vinyl acetate copolymer (EVA), polyamide-based hot melt, polyester-based hot melt, polyolefin-based hot melt, thermoplastic rubber-based hot melt, or reactive hot melt.

For example, in the case where the filler 17 is a time-lagged ultraviolet radiation curing resin, the gaps between the rear face of the display 14A and the plural projecting portions 29 are filled by the time-lagged ultraviolet radiation curing resin as follows. First, the time-lagged ultraviolet radiation curing resin is applied to each of the plural projecting portions 19, after which ultraviolet radiation is shone on the time-lagged ultraviolet radiation curing resin applied to each of the plural projecting portions 19. Next, the display 14A is placed on the sensor 20 before each of the time-lagged ultraviolet radiation curing resins on one of the projecting portion 19 cures, thus allowing each of the time-lagged ultraviolet radiation curing resins to cure. As a result, the gaps between the display 14A and the plural projecting portions 19 are filled by the time-lagged ultraviolet radiation curing resin.

As described above, even in the case where the electronic equipment 10 includes the plural fillers 16, each provided between the rear face of the display 14A and one of the plural projecting portions 29, it is possible to keep, to a minimum, variation in in-plane sensitivity of the sensor 20 as in the first embodiment described above.

Modification Example 2 of Filler

The electronic equipment 10 may include a layered filler 18 in place of the filler 16 in a film form, and more specifically, a curing resin layer, as illustrated in FIG. 7B. The curing resin layer includes, for example, an ultraviolet radiation curing resin, a thermal curing resin, a cured product of a hot melt adhesive, or the like.

For example, in the case where the filler 18 is a curing resin layer including a cured product of a time-lagged ultraviolet radiation curing resin, the gaps between the rear face of the display 14A and the plural projecting portions 29 are filled by the time-lagged ultraviolet radiation curing resin as follows. First, a coating film is formed by applying the time-lagged ultraviolet radiation curing resin to the rear face of the display 14A, followed by shining of ultraviolet radiation on the coating film. Next, before the coating film cures, the sensor 20 is placed on the coating film such that the plural projecting portions 29 are on the side of the coating film, and then, the coating film is allowed to cure.

Modification Example 3 of Filler

Although, in the first embodiment, a case where the electronic equipment 10 includes the single filler 16 in a film form between the front panel 14 and the plural projecting portions 29 has been described, the electronic equipment 10 may include plural small-piece fillers 16 in a film form each provided independently between the front panel 14 and one of the plural projecting portions 29.

Modification Example 1 of Sensor

Figure 8:
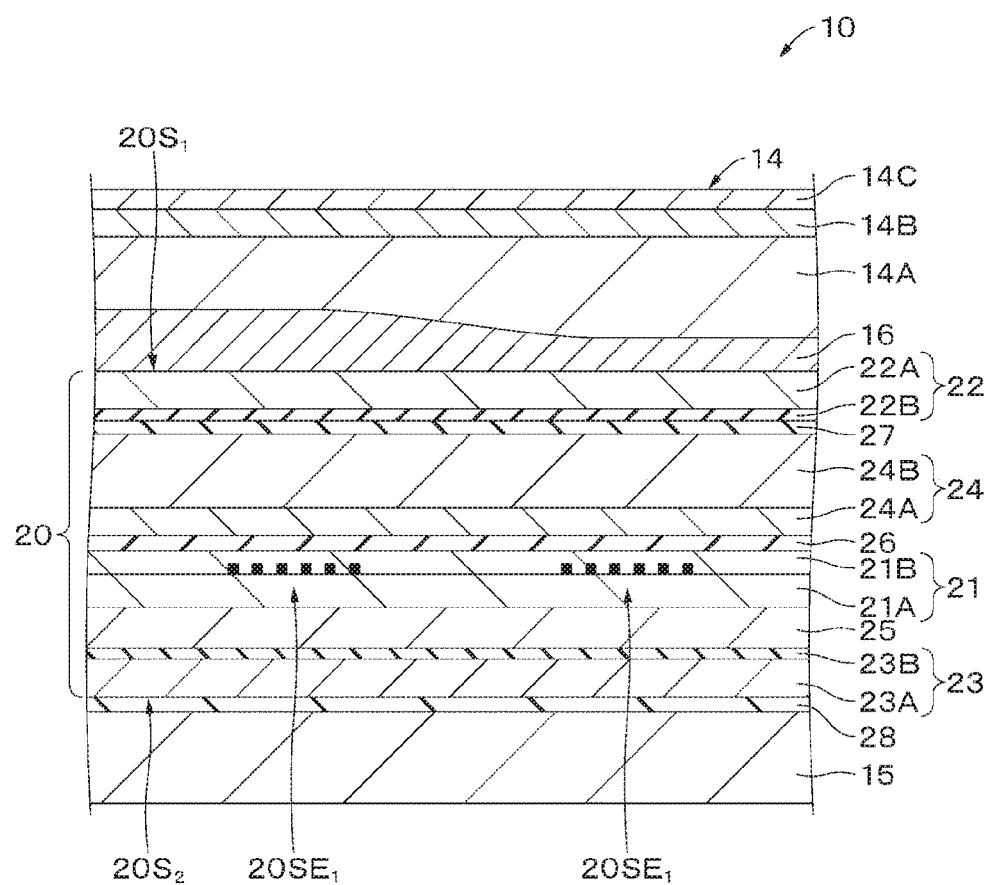
FIG. 8 is an enlarged cross-sectional view of the region near the front panel.

Although, in the first embodiment, a case where the plural projecting portions 29 are provided on the first face $20S_1$ has been described, the plural projecting portions 29 may not be provided on the first face $20S_1$. In this case, the electronic equipment 10 includes the filler 16 in a film form provided between the rear face of the display 14A and the first face $20S_1$ as illustrated in FIG. 8. The thickness of the filler 16 changes with the gap width between the rear face of the display 14A and the first face $20S_1$. This makes it possible to fill the gap between the rear face of the display 14A and the first face $20S_1$. Therefore, it is possible to keep, to a minimum, variation in in-plane sensitivity of the sensor 20.

Modification Example 2 of Sensor

In the first embodiment, the sensor 20 is not required to include the base materials 22A and 23A. That is, the sensor 20 may include the REF electrode layers 22B and 23B in place of the electrode base materials 22 and 23. In this case, the REF electrode layers 22B and 23B may be SUS plates.

Modification Example 3 of Sensor

Although, in the first embodiment, a configuration in which the sensor 20 includes the electrode base material 23 has been described, the sensor 20 is not required to include the electrode base material 23. It should be noted, however, that, in order to keep, to a minimum, entry of external noise (external electric field) into the sensor 20 from the side of the second face $20S_2$ of the sensor 20, that is, to keep, to a minimum, decline in detection accuracy or erroneous detection of the sensor 20 due to external noise, the sensor 20 preferably includes the electrode base material 23. Also, the support 15 may include the REF electrode layer 22B or a material similar to the REF electrode layer 22B instead of the sensor 20 including the electrode base material 23.

Modification Example 4 of Sensor

The sensor 20 may include a self-capacitive sensor electrode layer in place of the mutual-capacitive sensor electrode layer 21. In this case, the sensor electrode layer includes a base material and an electrode layer in a thin film form provided on top of the base material.

Modification Example 5 of Sensor

Although, in the first embodiment, a case where the sensor 20 includes the plural sensing sections $20SE_1$ and the plural sensing sections $20SE_2$ has been described, the sensor 20 may include either the plural sensing sections 20SE$_1$ or the plural sensing sections 20SE$_2$.

Modification Example of Electronic Equipment

The electronic equipment 10 may not include the touch panel 14B, and the sensor 20 may detect the pressing position in place of the touch panel 14B. In this case, the cover glass 14C is preferably pliable from the viewpoint of improving the detection sensitivity of the pressing position by the sensor 20.

Example of Electronic Equipment Other than Smartphone

Although, in the first embodiment, a case where the electronic equipment is a smartphone has been described, the present disclosure is not limited thereto and is applicable to a variety of pieces of electronic equipment having an exterior body such as a housing. For example, the present disclosure is applicable to a personal computer, a mobile phone other than smartphone, a TV set, a remote controller, a camera, a gaming console, a navigation system, an electronic book, an electronic dictionary, a mobile music player, a keyboard, a wearable terminal such as smartwatch or head-mounted display, a radio, a stereo, medical equipment, a robot, or the like. Also, the present disclosure is applicable to the input apparatus of one of these pieces of electronic equipment.

Example Other than Electronic Equipment

The present disclosure is not limited to electronic equipment and is applicable to a variety of things other than electronic equipment. For example, the present disclosure is applicable to electric equipment such as power tool, refrigerator, air-conditioner, water heater, microwave oven, dish washer, washing machine, dryer, lighting equipment, or toy. Further, the present disclosure is applicable to a building including a house, a building material, a conveyance, furniture such as a table or a desk, a manufacturing apparatus, an analyzer, or the like. Paving stones, wall materials, floor tiles, floor boards, and the like are among examples of building materials. A vehicle (e.g., automobile, motorcycle), a ship, a submarine, a rolling stock, an aircraft, a spaceship, an elevator, play equipment, and the like are among examples of conveyances. Also, the present disclosure is applicable to an input apparatus of these things other than electronic equipment.

(Suitable Application Example)

The present disclosure is particularly effective when applied to electronic equipment or the like having a pressed body with a large area (e.g., smartphone display) or a pressed body with a curved portion (e.g., curved display). In the case where a pressure-sensitive sensor in a film form is applied to electronic equipment or the like having a pressed body with a large area or a pressed body with a curved portion, a gap is particularly likely to be generated between the pressed body and the pressure-sensitive sensor. However, it is possible to keep, to a minimum, variation in detection sensitivity depending on the pressing position by applying the present disclosure to such electronic equipment. Also, the present disclosure is particularly effective when applied to a highly rigid pressed body such as side face, rear face, or the like of the smartphone housing.

2. Second Embodiment

[Configuration of Electronic Equipment]

Figure 9A:
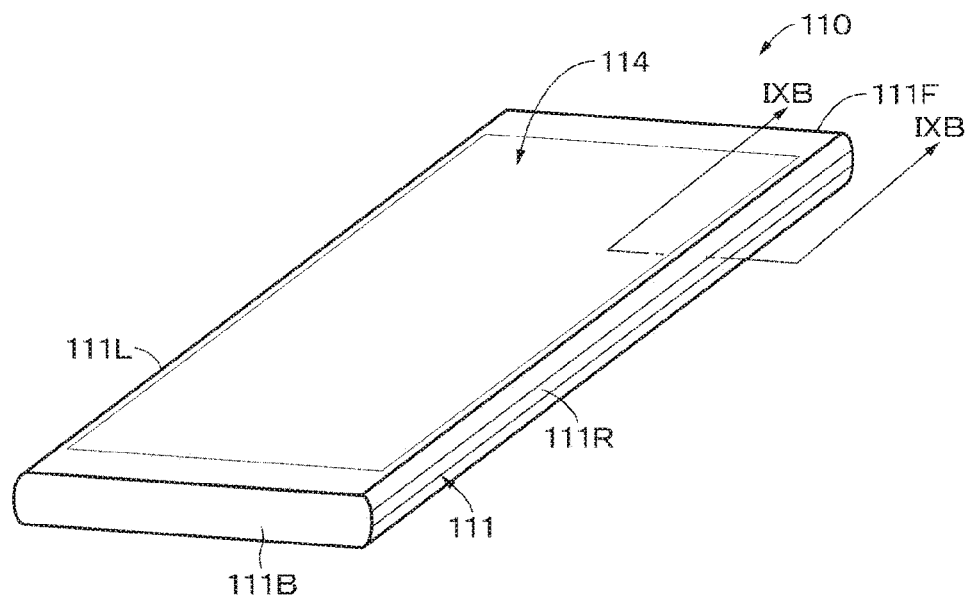
FIG. 9A is a perspective view of electronic equipment according to a second embodiment.
Figure 9B:
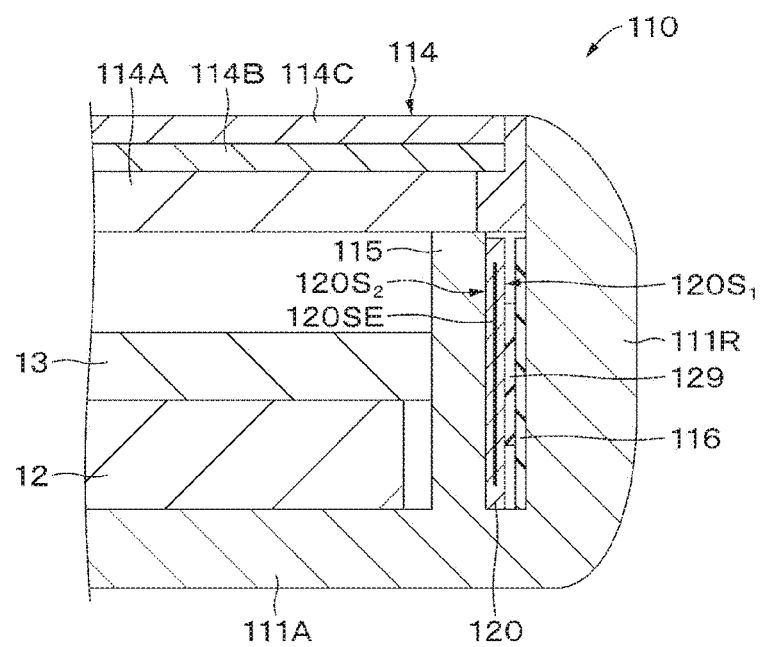
FIG. 9B is a cross-sectional view taken along line IXB-IXB in FIG. 9A.

Electronic equipment 110 according to a second embodiment is what is generally called a smartphone and includes a housing 111, the battery 12, the circuit board 13, and a front panel 114 as illustrated in FIGS. 9A and 9B. The housing 111 is in the shape of a thin box with its one main face left open. The battery 12 and the circuit board 13 are accommodated in the housing 111. The front panel 114 is provided in such a manner as to cover the one open main face of the housing 111. The electronic equipment 110 further includes a sensor 120, a support 115, and a filler 116. The sensor 20 is provided on an inner side face of the housing 11. The support 115 supports the sensor 120 such that the sensor 120 is opposed to the inner side face of the housing 11. The filler 16 is provided between the inner side face of the housing 11 and the sensor 120. It should be noted that, in the second embodiment, components identical to those of the first embodiment are denoted by the same reference signs and that the description thereof is omitted. An input apparatus includes the housing 111, the sensor 120, and the filler 116.

(Housing)

The housing 111 is an example of a pressed body and includes a rectangular bottom portion 11A, lateral wall portions 111R and 111L, and lateral wall portions 111F and 111B. The bottom portion 111A is included in the rear face of the electronic equipment 110. The lateral wall portions 111R and 111L are each provided along long sides of the bottom portion 111A. The lateral wall portions 111F and 111B are each provided along short sides of the bottom portion 111A. The lateral wall portions 111R and 111L are as tall as the lateral wall portions 111F and 111B.

(Front Panel)

The front panel 114 is rectangular in shape. The front panel 114 includes a display 114A, a capacitive touch panel 114B provided on a display face of the display 114A, and cover glass 114C provided on an input face of the touch panel 114B. The display 114A, the touch panel 114B, and the cover glass 114C are similar to the display 14A, the touch panel 14B, and the cover glass 14C of the first embodiment except for being rectangular.

(Sensor)

The sensor 120 is what is generally called a pressure-sensitive sensor and detects a pressure with which the lateral wall portion 111R is pressed. The sensor 120 is in the form of a long, narrow, and rectangular film as illustrated in FIG. 10. A first face 120S$_1$ of the sensor 120 is opposed to the inner side face of the lateral wall portion 111R, and a second face 120S$_2$ thereof is opposed to a supporting face of the support 115.

The sensor 120 includes plural sensing sections 120SE. The sensing sections 120SE are configured similarly to the sensing sections 20SE$_2$ in the first embodiment. The plural sensing sections 120SE are arranged in the longitudinal direction of the sensor 120 in a single line at equal intervals. It should be noted, however, that the number of lines of the plural sensing sections 120SE is not limited to one and that the sensing sections 120SE may be arranged in two or more lines. Also, the intervals at which the sensing sections 120SE are to be arranged are not limited to equal intervals, and the sensing sections 120SE may be arranged at irregular intervals depending on a desired characteristic.

Plural projecting portions 129 are provided on the first face 120S$_1$ of the sensor 120. The plural projecting portions 129 are each provided at a position corresponding to one of the plural sensing sections 120SE. More specifically, the plural projecting portions 129 are each provided in such a manner as to overlap one of the plural sensing sections 120SE in a thickness direction of the sensor 120. The sensor 120 is configured similarly to the sensor 20 in the first embodiment except in the above respect.

(Support)

The support 115 supports the sensor 120 such that the sensor 120 is opposed to an inner side face of the lateral wall portion 111R. The support 115 is a wall portion built on the bottom portion 111A and extends along the inner side face of the lateral wall portion 111R. A gap with a given width is provided between the lateral wall portion 111R and the support 115, with the sensor 120 and the filler 116 accommodated therein.

(Filler)

The filler 116 is provided between the inner side face of the lateral wall portion 111R and the first face $120S_1$ of the sensor 120. The filler 116 is designed to fill gaps between the inner side face of the lateral wall portion 111R and the plural projecting portions 129. The thickness of the filler 116 changes with the width of the gap between the inner side face of the lateral wall portion 111R and the plural projecting portions 129. The filler 116 is similar to the filler 16 in the first embodiment except that the filler 116 is in the form of a long, narrow, and rectangular film.

There is preferably no gap or nearly no gap between the filler 116 and the lateral wall portion 111R and between the filler 116 and the projecting portions 129 on the sensing sections 120SE. Here, the term "nearly no gap" refers to a condition in which the widths of the gaps between the filler 116 and the lateral wall portion 111R and between the filler 116 and the projecting portions 129 on the sensing sections 120SE are 0.1 μm or less.

[Advantageous Effect]

The electronic equipment 110 according to the second embodiment includes the housing 111, the sensor 120, the support 115, and the filler 116. The housing 111 has the lateral wall portion 111R. The sensor 120 has the first face $120S_1$ opposed to the inner side face of the lateral wall portion 111R, with the plural projecting portions 129 provided on the first face $120S_1$. The support 115 supports the sensor 120 such that the sensor 120 is opposed to the inner side face of the lateral wall portion 111R. The filler 116 in a film form fills the gaps between the lateral wall portion 111R and the plural projecting portions 129. This keeps, to a minimum, formation of gaps between the rear face of the lateral wall portion 111R and the plural projecting portions 129. Therefore, it is possible to keep, to a minimum, variation in sensitivity of the sensor 120 in a length direction of the lateral wall portion 111R.

Modification Example

Modification Example of Sensor

Although, in the second embodiment, a configuration in which the plural sensing sections 120SE are arranged one-dimensionally to form a single line has been described, the sensing sections 120SE may be arranged two-dimensionally to form two or more lines.

Modification Example of Electronic Equipment

Although, in the second embodiment, a configuration in which the electronic equipment 110 is capable of detecting a pressure with which the lateral wall portion 111R is pressed has been described, the electronic equipment 110 may be capable of detecting pressures with which both the lateral wall portions 111R and 111L are pressed. More specifically, the electronic equipment 110 may further include the sensor 120, the support 115, and the filler 116. The sensor 120 is provided on the inner side face of the lateral wall portion 111L. The support 115 supports the sensor 120 such that the sensor 120 is opposed to the inner side face of the lateral wall portion 111L. The filler 116 is provided between the inner side face of the lateral wall portion 111L and the sensor 120.

Also, the electronic equipment 110 may be capable of detecting a pressure with which the bottom portion 111A is pressed. Specifically, the electronic equipment 110 may include a sensor, a support, and a filler. The sensor is provided on the inner side face of the bottom portion 111A. The support supports the sensor such that the sensor is opposed to the inner side face of the bottom portion 111A. The filler is provided between the inner side face of the bottom portion 111A and the sensor.

Other Modification Example

The configuration described in the modification example of the first embodiment may be applied to the electronic equipment according to the second embodiment.

Working Examples

Although the present disclosure will be described below by way of working examples, the present disclosure is not limited to these working examples. It should be noted that components corresponding to those of the above embodiments will be denoted by the same reference signs for description in the following working examples.

Reference Sample as Criterion for Evaluating Variation

Reference Sample

Figure 11:
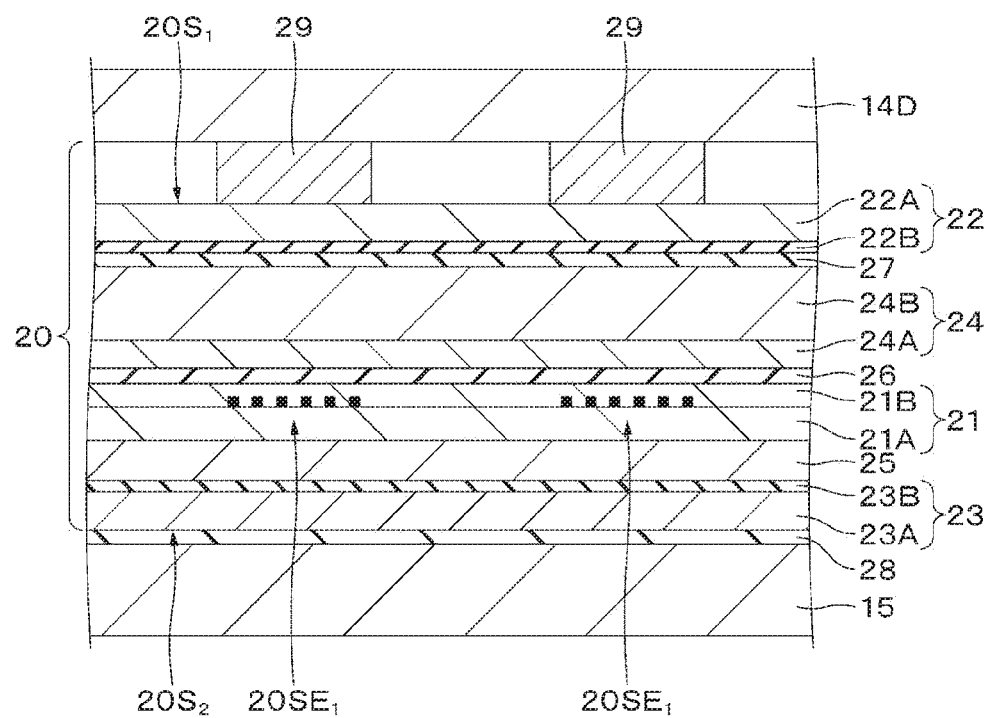
FIG. 11 is an enlarged cross-sectional view of a reference sample.

Electronic equipment configured as illustrated in FIG. 11 was prepared as a reference sample as follows. First, the sensor 20 in the form of a rectangular film was prepared by stacking the respective members listed below.

Electrode base material 22: Polyester film with vacuum-deposited aluminum (50 μm in thickness)

Adhesion layer 27: Double-sided adhesive film (manufactured by Nichiei Kako Co., Ltd., trade name: Neo Fix 10 (10 μm in thickness))

Support-equipped elastic layer 24: Laminate of polyurethane foam with a thickness of 200 μm and PET film with a thickness of 50 μm Adhesion layer 26: Double-sided adhesive film (manufactured by Nichiei Kako Co., Ltd., trade name: Neo Fix 30 (30 μm in thickness))

Sensor electrode layer 21: FPC

Gap layer 25: Double-sided adhesive film (manufactured by Nichiei Kako Co., Ltd., trade name: Neo Fix 100 (100 μm in thickness))

Electrode base material 23: Polyester film with vacuum-deposited aluminum (50 μm in thickness)

Figure 12:
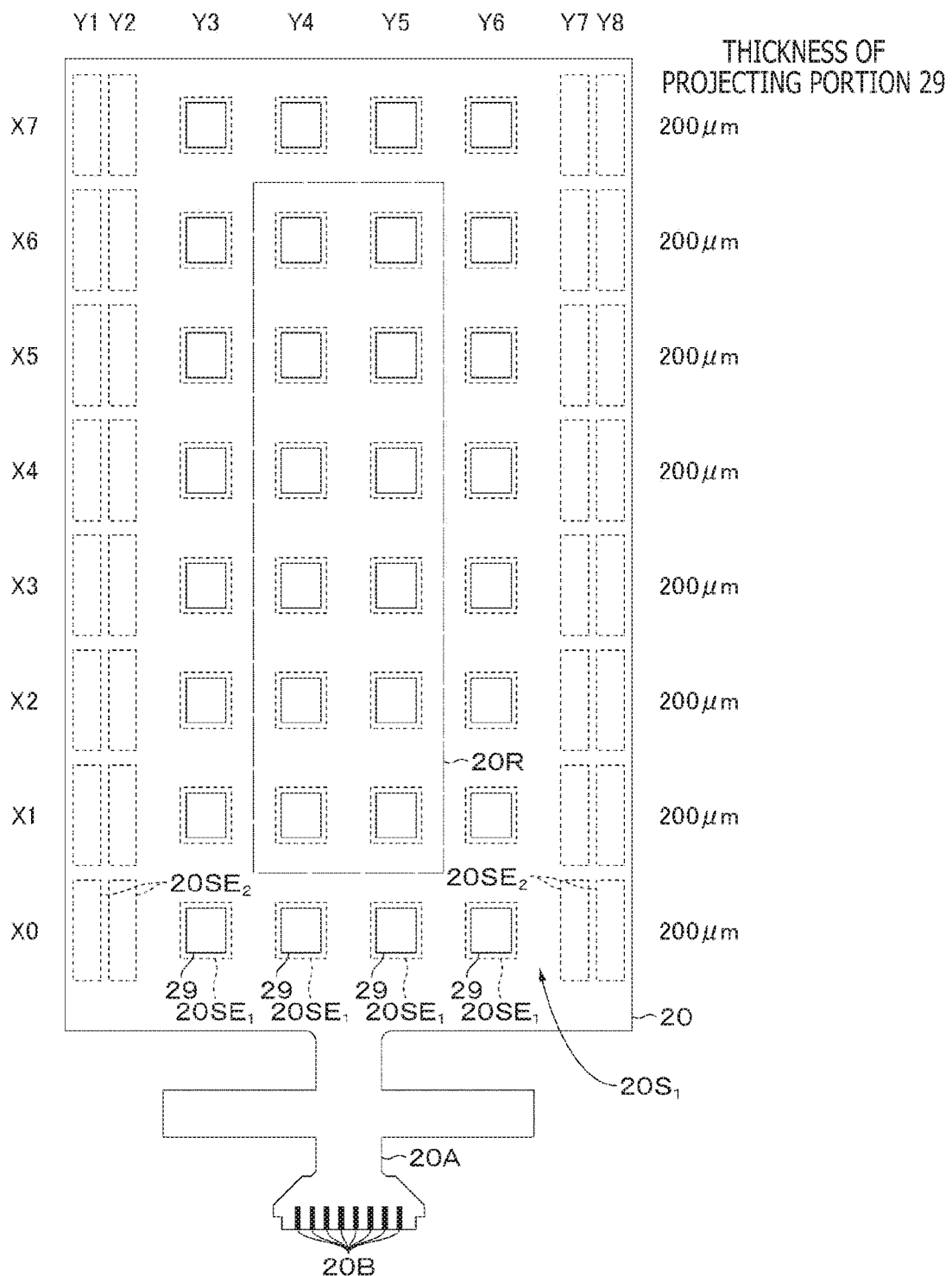
FIG. 12 is a plan view of the sensor used for the reference sample.

Next, plural small square pieces were obtained by cutting a double-sided adhesive film (manufactured by Nichiei Kako Co., Ltd., trade name: Neo Fix 200 (200 μm in thickness)). Next, the plural projecting portions 29 were formed by placing these small pieces in a matrix pattern on the first face $20S_1$ of the sensor 20 as illustrated in FIG. 12. At this time, each of the plural small pieces was placed on one of the plural sensing sections $20SE_1$.

Figure 15:
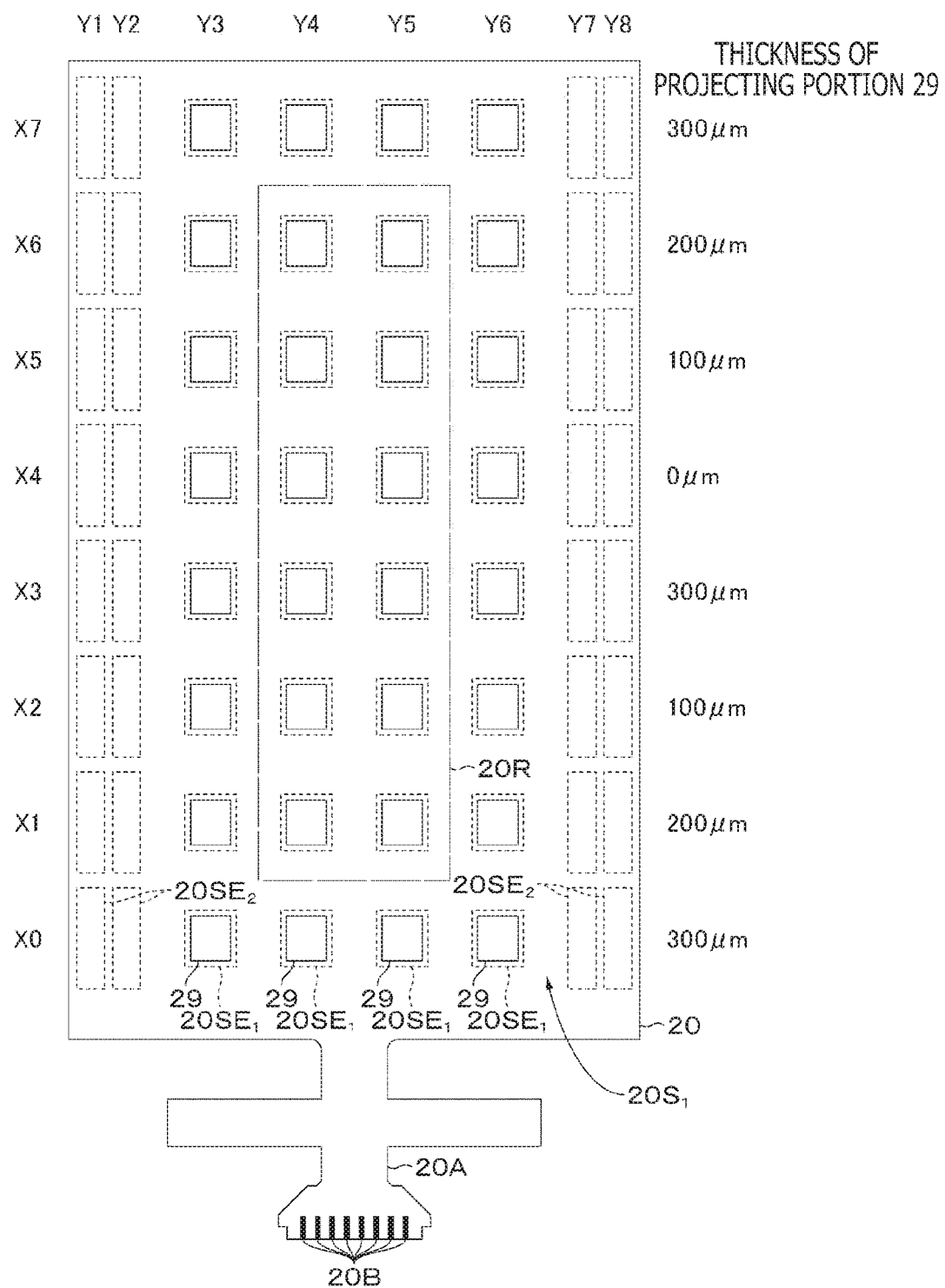
FIG. 15 is a plan view of the sensor used for sample 1.
Figure 20:
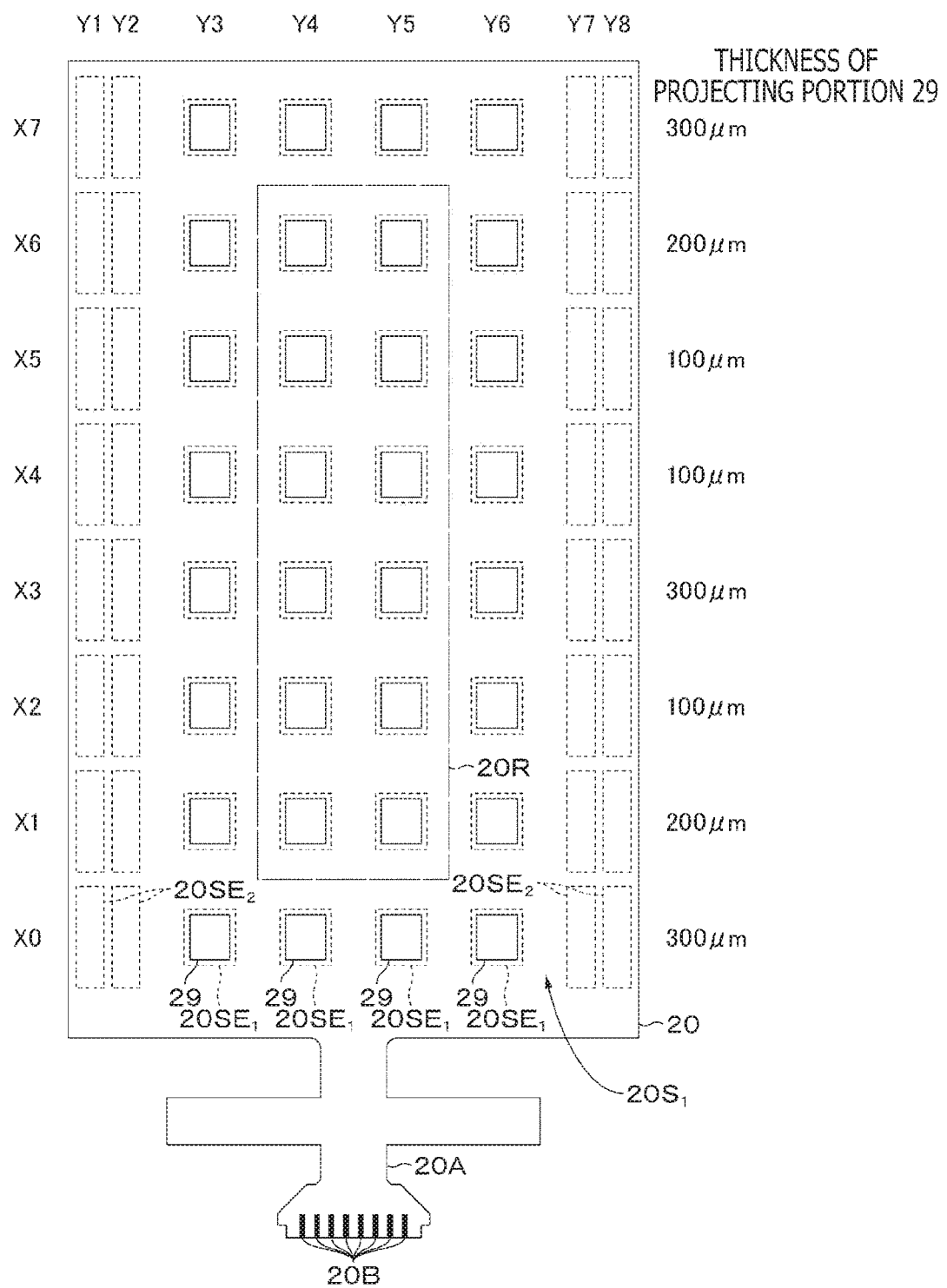
FIG. 20 is a plan view of a sensor used for electronic equipment of sample 4.

It should be noted that reference signs X1 to X8 in FIGS. 12, 15, and 20 represent row numbers of the plural sensing sections 20SE₁ arranged in a matrix pattern, whereas reference signs Y1 to Y8 represent column numbers of the plural sensing sections 20SE₁ arranged in a matrix pattern. Also, numbers along one long side of the sensor 20 represent a height [μm] of the projecting portions 29 in each row.

Next, the second face 20S₂ of the sensor 20 was stuck to the supporting face of the support 15 via the adhesion layer 28. A double-sided adhesive film (manufactured by Nichiei Kako Co., Ltd., trade name: Neo Fix 60 (60 μm in thickness)) was used as the adhesion layer 28. Next, a glass plate 14D of 0.8 mm in thickness was placed on the plural projecting portions 29 formed on the first face 20S₁. As a result, an intended piece of electronic equipment was obtained.

[Measurement of variation in load sensitivity]

First, sensor outputs (delta values) equivalent to changes in capacitance were obtained by using a silicon rubber key presser of φ 6 mm when each of the sensing sections 20SE1 in a region 20R depicted with a broken line in FIG. 12 was pressed with a force of 100 gf, 200 gf, 300 gf, 400 gf, and 500 gf each. Results thereof are illustrated in FIGS. 13A, 13B, 13C, and 13D.

Figure 13A:
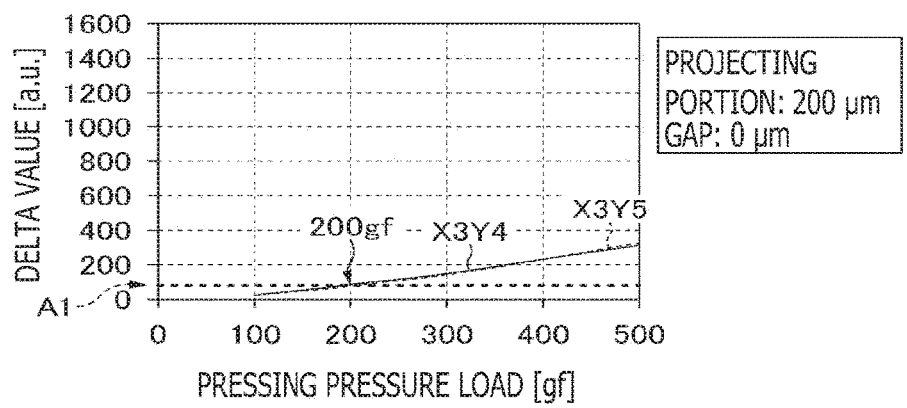
FIGS. 13A, 13B, 13C, and 13D are each graphs depicting evaluation results of a delta value of the reference sample.
Figure 13B:
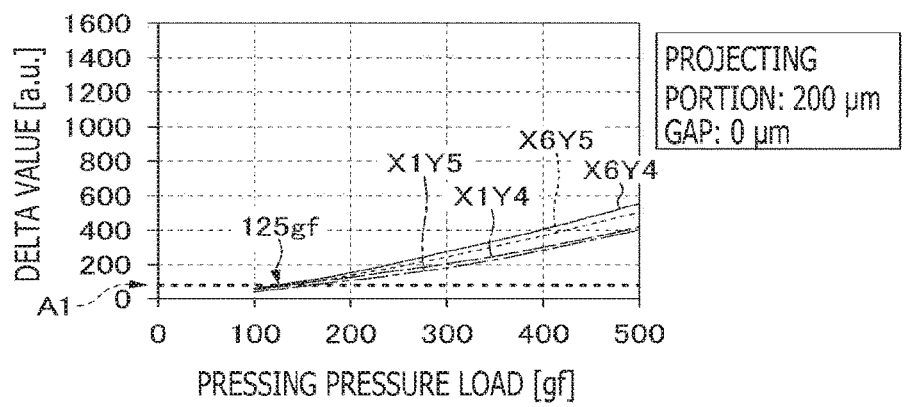
Figure 13C:
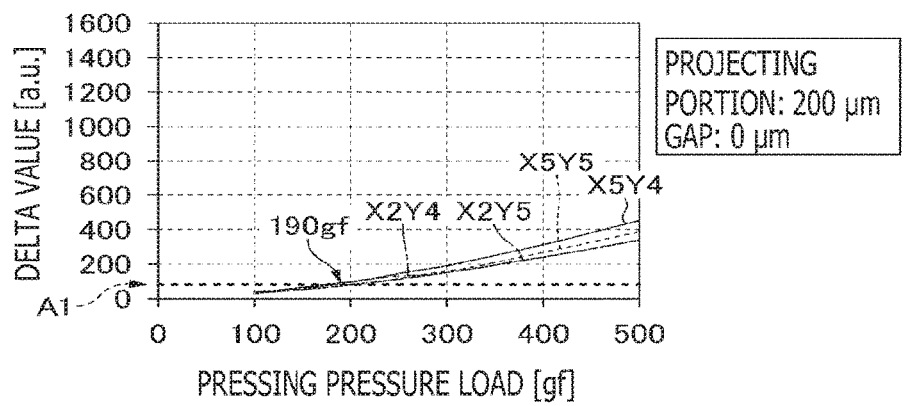
Figure 13D:
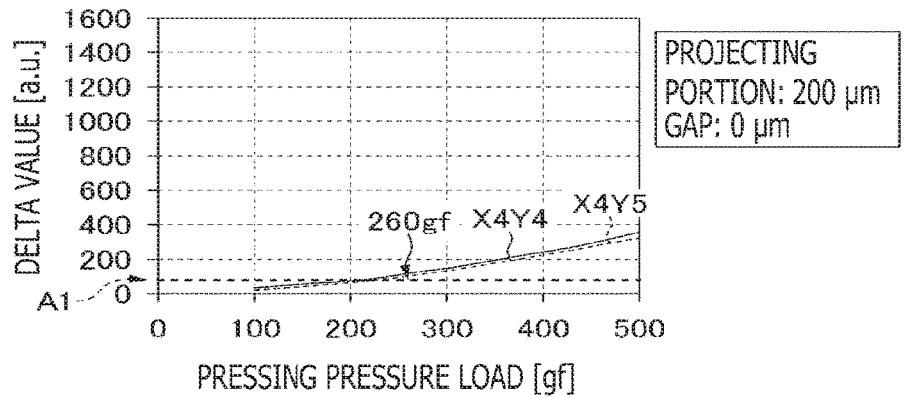

Next, an operation threshold A1 was obtained from a mean sensor output when the sensing sections 20SE1 arranged at a total of 12 nodes in the region 20R were pressed with a force of 200 gf. Results thereof are illustrated in FIGS. 13B, 13C, and 13D. Then, pressing pressure loads that provide the operation threshold A1 from the sensing sections 20SE1 arranged at X1Y4, X1Y5, X6Y4, and X6Y5, those arranged at X2Y4, X2Y5, X5Y4, and X5Y5, and those arranged at X4Y4 and X4Y5 were obtained. Results thereof are similarly illustrated in FIGS. 13B, 13C, and 13D.

It is clear from FIGS. 13B, 13C, and 13D that the variation in in-plane load sensitivity of the reference sample is 200±75 gf. Such a variation in in-plane load sensitivity is probably attributable to the following reasons (1) to (4) and the like. (1) The double-sided adhesive film used (Neo Fix 200) has a maximum tolerance of approximately ±10%. (2) The glass plate 14D is warped. (3) Each member used in the electronic equipment has a manufacturing error. (4) The sensor 20 varies in thickness.

Sample with Varying Heights of Projecting Portions

[Sample 1]

Figure 14:
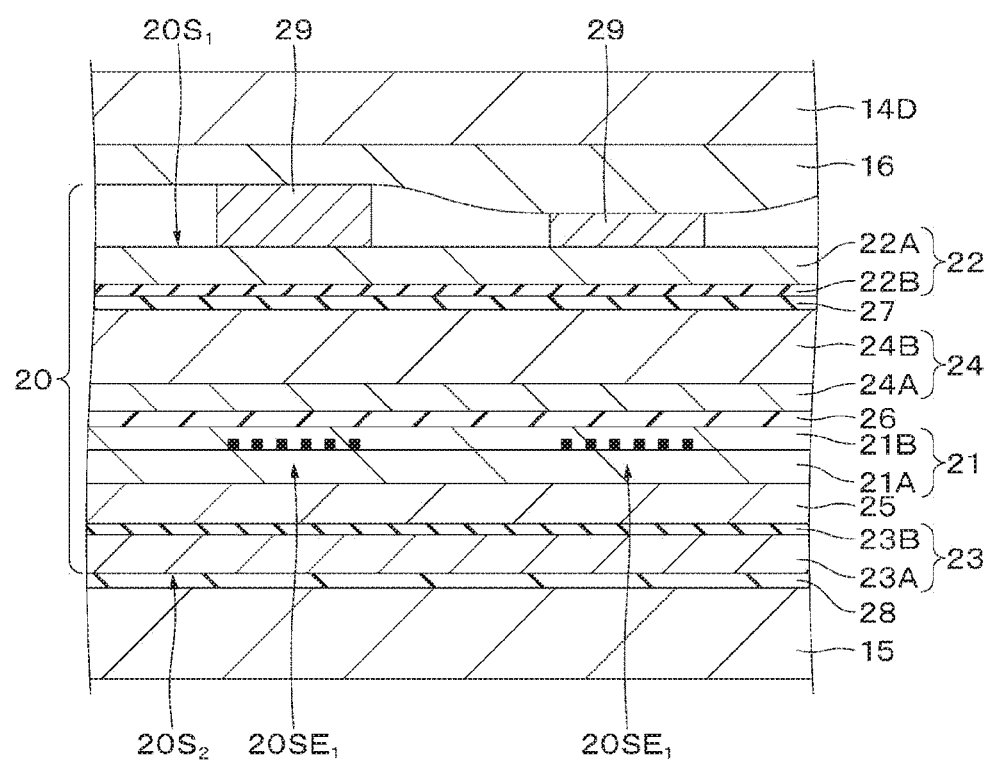
FIG. 14 is an enlarged cross-sectional view of sample 1.

In sample 1, electronic equipment having the configuration illustrated in FIG. 14 was prepared as follows. First, the sensor 20 in the form of a rectangular film was prepared similarly to the reference sample. Next, double-sided adhesive films with different thicknesses (manufactured by Nichiei Kako Co., Ltd., trade names: Neo Fix 100 (100 μm in thickness), Neo Fix 200 (200 μm in thickness), Neo Fix 300 (300 μm in thickness)) were made ready, and plural small square pieces with three different thicknesses were acquired by cutting the films. Next, these small pieces were arranged in a matrix pattern on the first face 20S₁ of the sensor 20 as illustrated in FIG. 12, thus forming the plural projecting portions 29. At this time, the plural small pieces were each arranged on one of the plural sensing sections 20SE₁. Also, the small pieces with different thicknesses from one row to another were arranged as illustrated in FIG. 15.

Next, the second face 20S₂ of the sensor 20 was stuck to the supporting face of the support 15 via the adhesion layer 28. A double-sided adhesive film (manufactured by Nichiei Kako Co., Ltd., trade name: Neo Fix 60 (60 μm in thickness)) was used as the adhesion layer 28. Next, a foam film of 50 μm in thickness was placed on the plural projecting portions 29 formed on the first face 20S₁, as the filler 16. Then, the glass plate 14D of 0.8 mm in thickness was placed on the foam film. Thereafter, the foam film was caused to foam through heating, thus inflating in the direction of its thickness. At this time, a foaming state was regulated to provide 330 μm as a post-foaming thickness of the foam film. As a result, an intended piece of electronic equipment was obtained.

[Sample 2]

A piece of electronic equipment was obtained similarly to sample 1 except that the filler 16 was not caused to foam through heating.

[Sample 3]

Figure 16:
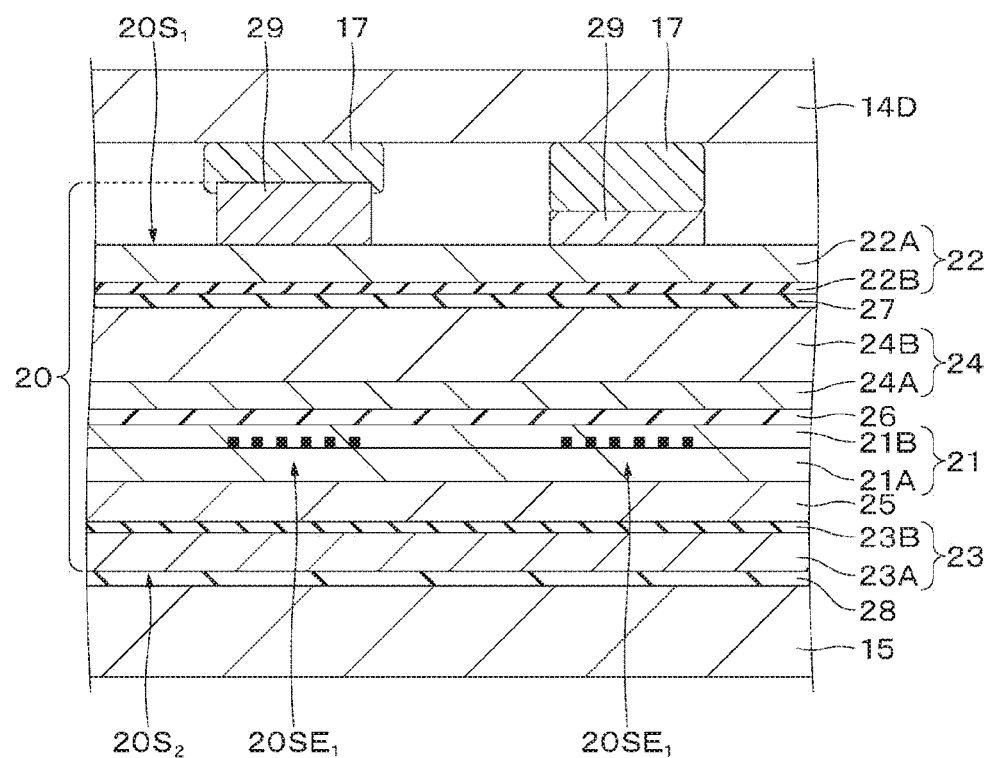
FIG. 16 is an enlarged cross-sectional view of sample 3.
Figure 17A:
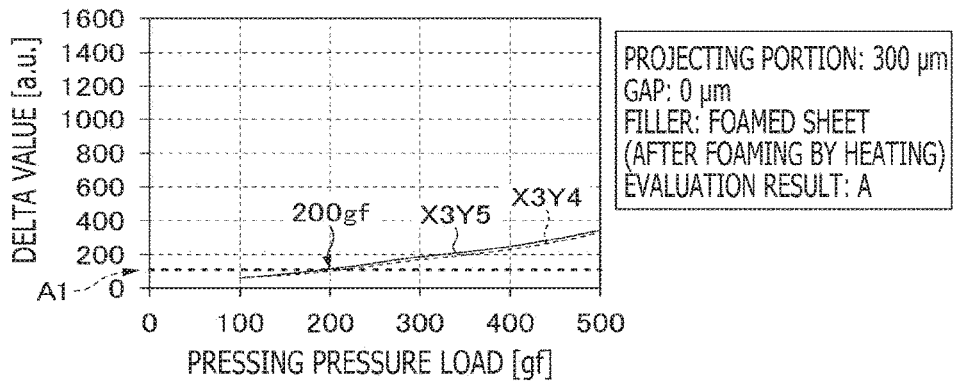
FIGS. 17A, 17B, 17C, and 17D are each graphs depicting evaluation results of the delta value of sample 1.
Figure 17B:
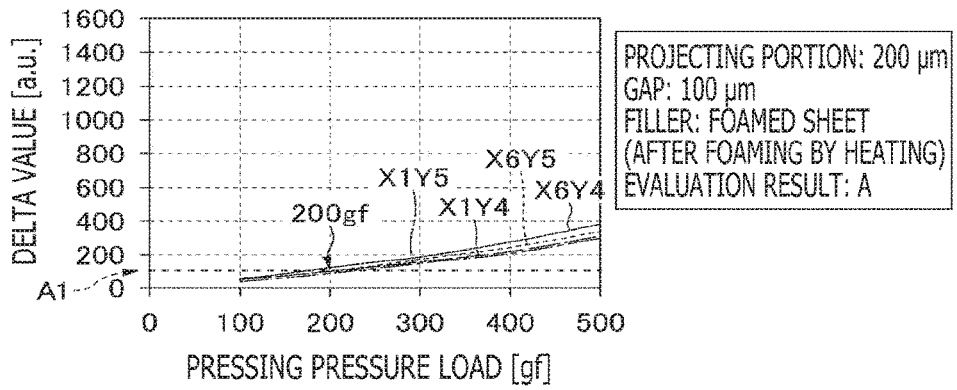
Figure 17C:
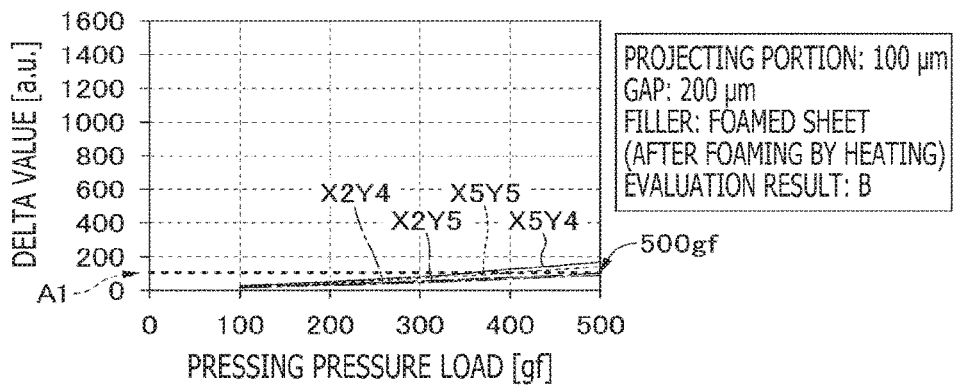
Figure 17D:
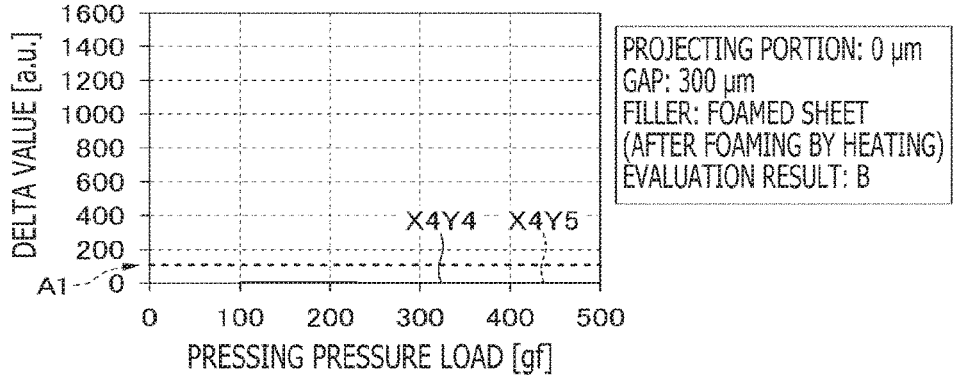
Figure 18A:
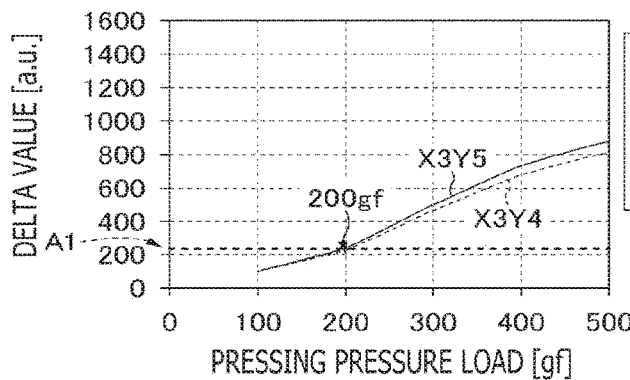
FIGS. 18A, 18B, 18C, and 18D are each graphs depicting evaluation results of the delta value of sample 2.
Figure 18B:
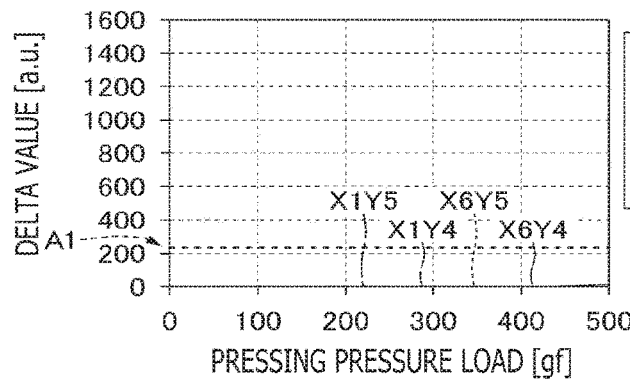
Figure 18C:
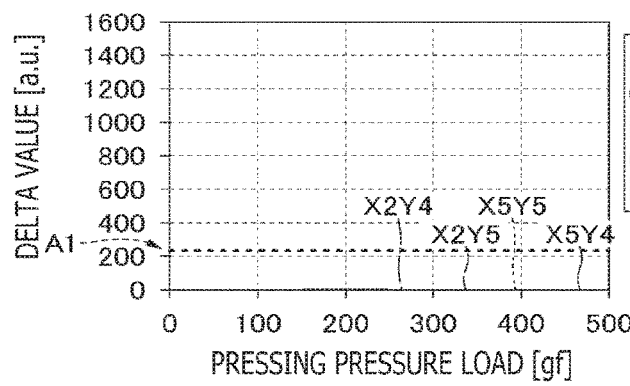
Figure 18D:
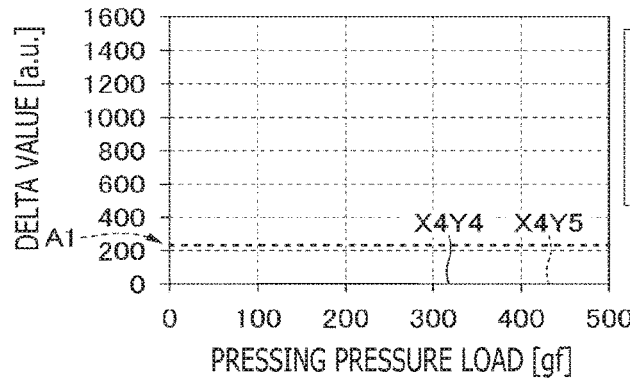
Figure 19A:
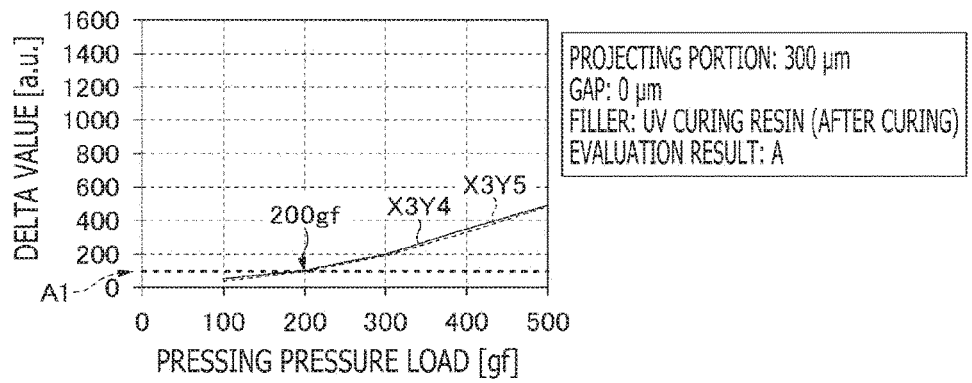
FIGS. 19A, 19B, 19C, and 19D are each graphs depicting evaluation results of the delta value of sample 3.
Figure 19B:
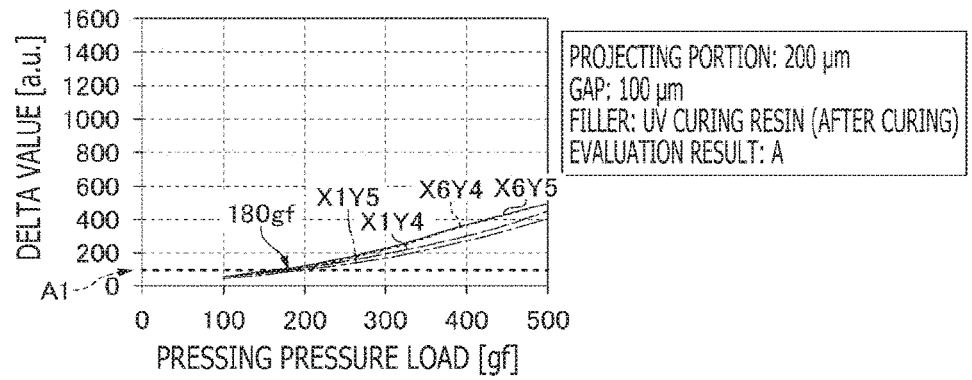
Figure 19C:
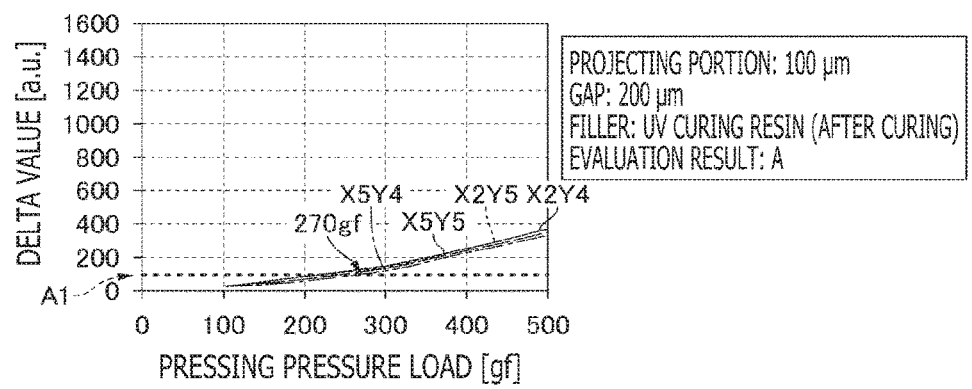
Figure 19D:
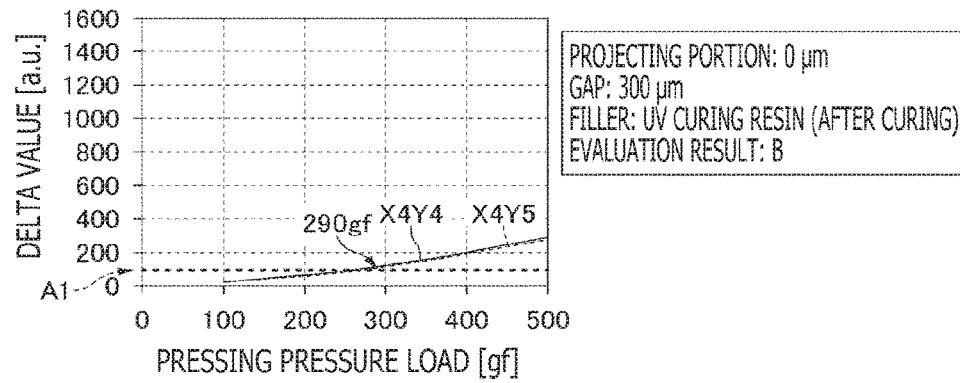

In sample 3, electronic equipment having the configuration illustrated in FIG. 16 was prepared as follows. First, the sensor 20 in the form of a rectangular film having the plural projecting portions 29 formed in a matrix pattern on the first face 20S₁ was prepared similarly to sample 1. Next, an ultraviolet radiation curing resin as the filler 16 was applied to each of the plural projecting portions 29 to a thickness of 300 μm, followed by shining of ultraviolet radiation on each of the applied ultraviolet radiation curing resins. As an ultraviolet radiation curing resin, a time-lagged ultraviolet radiation curing resin that cures in approximately 10 minutes under an environment of 60° C. was used. Next, before the ultraviolet radiation curing resin cured, the glass plate 14D of 0.8 mm in thickness was placed on the ultraviolet radiation curing resin, and the ultraviolet radiation curing resin was allowed to cure in this state. As a result, an intended piece of electronic equipment was obtained.

[Evaluation of variation in load sensitivity]

First, the variation in load sensitivity was measured similarly to the "measurement of variation in load sensitivity" of the reference sample. Results thereof are illustrated in FIGS. 17A, 17B, 17C, 17D, 18A, 18B, 18C, 18D, 19A, 19B, 19C, and 19D. Next, the measured variation in load sensitivity was evaluated as follows with reference to 200±75 gf as the variation in load sensitivity of the reference sample. Results thereof are illustrated in FIGS. 17A, 17B, 17C, 17D, 18A, 18B, 18C, 18D, 19A, 19B, 19C, and 19D.

Possible to keep, to a minimum, variation in in-plane load sensitivity: Variation in load sensitivity is within a range from 125 to 275 gf Difficult to keep, to a minimum, variation in in-plane load sensitivity: Variation in load sensitivity is outside the range from 125 to 275 gf It should be noted that, in FIGS. 17A, 17B, 17C, 17D, 18A, 18B, 18C, 18D, 19A, 19B, 19C, and 19D, an evaluation result "A" indicates that it is "possible to keep, to a minimum, variation in in-plane load sensitivity" and that an evaluation result "B" indicates that it is "difficult to keep, to a minimum, variation in in-plane load sensitivity."

The following is clear from FIGS. 17A, 17B, 17C, and 17D. That is, a gap of 100 μm or less makes it possible to keep, to a minimum, variation in in-plane load sensitivity. Meanwhile, a gap of 200 μm or more makes it difficult to keep, to a minimum, variation in in-plane load sensitivity. The reason for this is that, in the presence of a gap of 200 μm or more, a foamed foam film was unable to fill the gaps between the plural projecting portions 29 and the glass plate 14D.

The following is clear from FIGS. 18A, 18B, 18C, and 18D. That is, a sensor output is hardly obtained if there is a gap of 100 μm or more between the plural projecting portions 29 and the glass plate 14D. The reason for this is that, in the presence of a gap of 100 µm or more, an unfoamed foam film was unable to fill the gaps between the plural projecting portions 29 and the glass plate 14D. Also, because the glass plate 14D is supported only by the projecting portions 29 of 300 µm in height, the sensing sections 20SE1 disposed immediately below the projecting portions 29 of 300 µm in height exhibit high sensitivity.

The following is clear from FIGS. 19A, 19B, 19C, and 19D. That is, a gap of 200 µm or less makes it possible to keep, to a minimum, variation in in-plane load sensitivity. Meanwhile, a gap of 300 µm or more makes it difficult to keep, to a minimum, variation in in-plane load sensitivity. The reason for this is that, in the presence of a gap of 300 µm or more, it was impossible to fill the gaps between the plural projecting portions 29 and the glass plate 14D. It should be noted that, in sample 3, although an ultraviolet radiation curing resin was applied to the projecting portions 29 to a thickness of 300 µm, the post-curing thickness of the ultraviolet radiation curing resin was probably less than 300 µm due to shrinking of the ultraviolet radiation curing resin at the time of curing.

Sample Using Various Fillers

[Sample 4]

First, the sensor 20 having the plural projecting portions 29 arranged in a matrix pattern (dotted pattern) on the first face 20S₁ as illustrated in FIG. 20 was obtained similarly to sample 1 except that the heights of the projecting portions 29 were changed from one row to another. Small square pieces of double-sided adhesive films (manufactured by Nichiei Kako Co., Ltd., trade names: Neo Fix 100 (100 µm in thickness), Neo Fix 200 (200 µm in thickness)) were used as the projecting portions 29.

Next, a coating film was formed by applying an ultraviolet radiation curing resin as the filler 16 to one face of the glass plate 14D of 0.8 mm to a thickness of 100 µm, followed by shining of ultraviolet radiation on the coating film. At this time, duration of shining ultraviolet radiation was regulated such that the elastic modulus of the cured ultraviolet radiation curing resin was 1000 kPa. Next, the sensor 20 was placed on the coating film such that the plural projecting portions 29 were on the side of the coating film, and the coating film was allowed to cure in this state. As a result, the layered filler 18 was formed between the plural projecting portions 29 and the glass plate 14D. Thus, an intended piece of electronic equipment was obtained.

[Sample 5]

First, the sensor 20 having the plural projecting portions 29 arranged in a matrix pattern on the first face 20S₁ was obtained similarly to sample 4. Next, an ultraviolet radiation curing resin was applied to each of the plural projecting portions 29 to a thickness of 100 µm, followed by shining of ultraviolet radiation on the applied ultraviolet radiation curing resin. At this time, the duration of shining ultraviolet radiation was regulated such that the elastic modulus of the cured ultraviolet radiation curing resin was 1000 kPa. A piece of electronic equipment was obtained by performing steps similar to those of sample 3 from here onward.

[Sample 6]

A piece of electronic equipment was obtained similarly to sample 4 except that a hot melt resin was applied to the one face of the glass plate 14D instead of applying an ultraviolet radiation curing resin.

[Sample 7]

The plural projecting portions 29 were arranged in a matrix pattern on the first face 20S₁ similarly to sample 4. Also, the foaming state of the filler 16 was regulated to provide 200 µm as a post-foaming thickness of the filler 16. A piece of electronic equipment was obtained by performing steps similar to those of sample 1 except for the above.

[Sample 8]

A piece of electronic equipment was obtained by performing steps similar to those of sample 7 except that the foaming state of the filler 16 was regulated to provide 300 µm as a post-foaming thickness of the filler 16.

[Sample 9]

First, the sensor 20 having the plural projecting portions 29 arranged in a matrix pattern on the first face 20S₁ was obtained similarly to sample 4. Next, a foam film of 50 µm in thickness was made ready as the filler 16, and plural small pieces were prepared by cutting the foam film into an approximate size of an upper face of the projecting portion 29. Next, each of these small pieces was arranged on one of the plural projecting portions 29, followed by placing the glass plate 14D of 0.8 mm in thickness on the filler 16. Thereafter, the plural small pieces were caused to foam through heating, thus inflating in the direction of their thickness. At this time, the foaming state was regulated to provide 300 µm as a post-foaming thickness of the small pieces. Thus, an intended piece of electronic equipment was obtained.

[Sample 10]

A piece of electronic equipment was obtained similarly to sample 4 except that the glass plate 14D was directly placed on the plural projecting portions 29 by omitting the step of applying an ultraviolet radiation curing resin to the one face of the glass plate 14D.

[Evaluation of Variation in Sensitivity]

The variation in variation in sensitivity was evaluated similarly to "evaluation of variation in load sensitivity" described above. It should be noted that the evaluation was conducted on the sensing sections (nodes) 20SE₁ included in the region 20R in FIG. 20.

TABLE 1

| | Elastic layer | Filler | | | | | |
|---|---|---|---|---|---|---|---|
| | Elastic modulus (25% CLD) [kPa] | Material | Shape | Post-curing or -foaming elastic modulus (25% CLD) [kPa] | Pre-foaming thickness [µm] | Post-foaming thickness [µm] | Sensitivity variation |
| Sample 4 | 0.011 | Ultraviolet radiation curing resin | Layered | 1000 | — | — | A |
| Sample 5 | 0.011 | | Dotted | 1000 | — | — | A |
| Sample 6 | 0.011 | Hot melt resin | Layered | 1000 | — | — | A |

TABLE 1-continued

| | Elastic layer | Filler | | | | | |
|---|---|---|---|---|---|---|---|
| | Elastic modulus (25% CLD) [kPa] | Material | Shape | Post-curing or -foaming elastic modulus (25% CLD) [kPa] | Pre-foaming thickness [μm] | Post-foaming thickness [μm] | Sensitivity variation |
| Sample 7 | 0.011 | Foaming agent | Layered | 2 | 50 | 200 | A |
| Sample 8 | 0.011 | | | 2 | 50 | 300 | A |
| Sample 9 | 0.011 | | Dotted | 2 | 50 | 300 | A |
| Sample 10 | 0.011 | None | — | — | — | — | B |

It should be noted that the variation in sensitivity of sample 9 demonstrated a tendency to be larger than the variation in sensitivity of sample 8 due to excessive foaming of the filler 16.

However, the variation in sensitivity of sample 10 demonstrated almost no tendency to be larger than the variation in sensitivity of sample 8 despite a foaming state (post-foaming thickness) similar to that of sample 9. The possible reason for this is that in the case where the filler 16 is arranged in a dotted pattern, the elastic layer 24B is unlikely to crush because the filler 16 can spread to a surrounding region even in the event of being excessively foamed.

From the above evaluation results, it is clear that it is possible to keep, to a minimum, variation in in-plane load sensitivity by using any of an ultraviolet radiation curing resin, a hot melt resin, or a foaming agent as a filler.

It is also clear that it is possible to keep, to a minimum, variation in in-plane load sensitivity by using either a layered or dotted pattern as a shape of the filler.

The first and second embodiments of the present disclosure and modification examples thereof have been described specifically above. However, the present disclosure is not limited to the first and second embodiments and modification examples thereof and can be modified in various ways on the basis of the technical idea of the present disclosure.

The configurations, methods, steps, shapes, materials, numerical values, and the like given in the first and second embodiments and modification examples thereof are merely examples, and a configuration, method, step, shape, material, numerical value, or the like different therefrom may be used as necessary.

The configurations, methods, steps, shapes, materials, numerical values, and the like given in the first and second embodiments and modification examples thereof can be combined without departing from the gist of the present disclosure.

Further, the present disclosure can also have the following configurations.

(1)
Electronic equipment including:
a pressed body as either a housing or a display;
a pressure-sensitive sensor;
a support configured to support the pressure-sensitive sensor such that the pressure-sensitive sensor is opposed to the pressed body; and
a filler provided between the pressed body and the pressure-sensitive sensor, in which
the filler has a thickness that changes with distance between the pressed body and the pressure-sensitive sensor.
(2)
The electronic equipment of feature (1), in which the filler includes a foaming agent that foams under heat.
(3)
The electronic equipment of feature (2), in which the filler further includes an antifoaming agent.
(4)
The electronic equipment of feature (1), in which the filler includes an ultraviolet radiation curing resin.
(5)
The electronic equipment of feature (1), in which the filler includes a thermal curing resin.
(6)
The electronic equipment of feature (1), in which the filler includes a hot melt resin.
(7)
The electronic equipment of any one of features (1) to (6), in which the filler includes a film or a layer.
(8)
The electronic equipment of any one of features (1) to (6), in which the fillers are in a dotted pattern.
(9)
The electronic equipment of feature (8), in which
the pressure-sensitive sensor includes plural sensing sections, and
the fillers are arranged to correspond to the plural sensing sections.
(10)
The electronic equipment of any one of features (1) to (9), in which
the pressure-sensitive sensor includes
plural capacitive sensing sections,
a reference electrode layer, and
an elastic layer provided between the reference electrode layer and the sensing sections.
(11)
The electronic equipment of feature (10), in which
the elastic layer is smaller in elastic modulus than the filler.
(12)
The electronic equipment of feature (10) or (11), in which
the elastic layer has an elastic modulus of 0.04 MPa or less,
the elastic layer has a thickness of 10 to 1000 μm, and
the elastic layer has an area occupancy of 10% to 100%.
(13)
Electronic equipment including:
a pressed body as either a housing or a display;
a pressure-sensitive sensor having a face opposed to the pressed body and plural projecting portions provided on the face;
a support configured to support the pressure-sensitive sensor such that the pressure-sensitive sensor is opposed to the pressed body; and
a filler provided between the pressed body and the plural projecting portions.

(14)

The electronic equipment of feature (13), in which the filler has a thickness that changes with distance between the pressed body and the plural projecting portions.

(15)

The electronic equipment of feature (13), in which the filler includes a film or a layer provided between the pressed body and the plural projecting portions.

(16)

The electronic equipment of feature (13), in which the fillers are each provided independently of each other between the pressed body and the plural projecting portions.

(17)

The electronic equipment of any one of features (13) to (16), in which the pressure-sensitive sensor includes plural sensing sections, and the plural projecting portions are each provided to correspond to one of the plural sensing sections.

(18)

The electronic equipment of any one of features (13) to (16), in which the pressure-sensitive sensor includes plural capacitive sensing sections, a reference electrode layer, and an elastic layer provided between the reference electrode layer and the sensing sections, and the plural projecting portions are each provided to correspond to one of the plural sensing sections.

(19)

An input apparatus including:

a pressed body as either a housing or a display;

a pressure-sensitive sensor;

a support configured to support the pressure-sensitive sensor such that the pressure-sensitive sensor is opposed to the pressed body; and a filler provided between the pressed body and the pressure-sensitive sensor, in which the filler has a thickness that changes with distance between the pressed body and the pressure-sensitive sensor.

(20)

An input apparatus including:

a pressed body as either a housing or a display;

a pressure-sensitive sensor having a face opposed to the pressed body and plural projecting portions provided on the face;

a support configured to support the pressure-sensitive sensor such that the pressure-sensitive sensor is opposed to the pressed body; and a filler provided between the pressed body and the plural projecting portions.

REFERENCE SIGNS LIST 10, 110 Electronic equipment
11, 111 Housings
11M, 111M Bottom portions
11R, 11L, 11F, 11B, 111R, 111L, 111F, 111 Lateral wall portions
12 Battery
13 Circuit board
13A CPU
13B, 13C Controller ICs
14, 114 Front panels
14A, 114A Displays
14B, 114B Touch panels
14C, 114C Cover glass
15, 115 Supports
16, 17, 18, 116 Fillers
20, 120 Sensors
20A Connection section
20B Connection terminals
$20S_1$, $120S_1$ First faces
$20S_2$, $120S_2$ Second faces
$20SE_1$, $20SE_2$, $120SE_1$ Sensing sections
21 Sensor electrode layer
21A Base material
21B Protective layer
21C Pulse electrode
21D Sensing electrode
21E, 21F Wires
22, 23 Electrode base materials
22A, 23A Base materials
22B, 23B Reference electrode layer
24 Support-equipped elastic layer
24A Support
24B Elastic layer
25 Gap layer
26 to 28 Adhesion layers
29 Projecting portions

The invention claimed is:

1. An electronic equipment, comprising:
a pressed body, wherein the pressed body is one of a housing or a display;
a pressure-sensitive sensor, wherein
the pressure-sensitive sensor includes a plurality of sensing sections, a first reference electrode layer, and a second reference electrode layer, and
the plurality of sensing sections is between the first reference electrode layer and the second reference electrode layer;
a support configured to support the pressure-sensitive sensor such that the pressure-sensitive sensor is opposed to the pressed body;
a plurality of projecting portions in direct contact with a face of the pressure-sensitive sensor, wherein
the face of the pressure-sensitive sensor is opposite to the pressed body,
the first reference electrode layer is between the plurality of projecting portions and the plurality of sensing sections,
each of the plurality of projecting portions corresponds to one of the plurality of sensing sections, and
a height of a first projecting portion of the plurality of projecting portions is different from a height of a second projecting portion of the plurality of projecting portions; and
a filler that includes a first surface and a second surface opposite to the first surface, wherein
the first surface of the filler is in direct contact with the pressed body,
and
a thickness of the filler corresponding to the first projecting portion is different from the thickness of the filler corresponding to the second projecting portion such that the second surface of the filler is in direct contact with each of the first projecting portion and the second projecting portion.

2. The electronic equipment of claim 1, wherein the filler further includes a foaming agent that foams under heat.

3. The electronic equipment of claim 2, wherein the filler further includes an antifoaming agent.

4. The electronic equipment of claim 1, wherein the filler further includes an ultraviolet radiation curing resin.

5. The electronic equipment of claim 1, wherein the filler further includes a thermal curing resin.

6. The electronic equipment of claim 1, wherein the filler further includes a hot melt resin.

7. The electronic equipment of claim 1, wherein the filler further includes one of a film or a layer.

8. The electronic equipment of claim 1, wherein the filler is in a dotted pattern.

9. The electronic equipment of claim 8, wherein a portion of the filler corresponds to each of the plurality of sensing sections.

10. The electronic equipment of claim 1, wherein
the pressure-sensitive sensor includes an elastic layer, and
the elastic layer is between the first reference electrode layer and the plurality of sensing sections,
the elastic layer comprises a plurality of space portions that penetrate the elastic layer in a thickness direction of the pressure-sensitive sensor.

11. The electronic equipment of claim 10, wherein an elastic modulus of the elastic layer is smaller than an elastic modulus of the filler.

12. The electronic equipment of claim 10, wherein
an elastic modulus of the elastic layer is equal to 0.04 MPa or less than 0.04 MPa,
the elastic layer has a thickness in a range between 10 μm and 1000 μm, and
the elastic layer has an area occupancy in a range between 10% and 100%.

13. An electronic equipment, comprising:
a pressed body, wherein the pressed body is one of a housing or a display;
a pressure-sensitive sensor, wherein
the pressure-sensitive sensor includes a plurality of sensing sections, a first reference electrode layer, and a second reference electrode layer, and
the plurality of sensing sections is between the first reference electrode layer and the second reference electrode layer;
a plurality of projecting portions in direct contact with a face of the pressure-sensitive sensor, wherein
the face of the pressure-sensitive sensor is opposite to the pressed body,
the first reference electrode layer is between the plurality of projecting portions and the plurality of sensing sections, and
a height of a first projecting portion of the plurality of projecting portions is different from a height of a second projecting portion of the plurality of projecting portions;
a support configured to support the pressure-sensitive sensor such that the pressure-sensitive sensor is opposed to the pressed body; and
a plurality of fillers that includes a first surface and a second surface opposite to the first surface, wherein
the first surface of the plurality of fillers is in direct contact with the pressed body, and
a thickness of a first filler of the plurality of fillers corresponding to the first projecting portion is different from a thickness of a second filler of the plurality of fillers corresponding to the second projecting portion, such that the second surface of the first filler is in direct contact with the first projecting portion, and the second surface of the second filler is in direct contact with the second projecting portion.

14. The electronic equipment of claim 13, wherein a thickness of each of the plurality of fillers is based on a distance between the pressed body and the plurality of projecting portions.

15. The electronic equipment of claim 13, wherein each of the plurality of fillers includes one of a film or a layer.

16. The electronic equipment of claim 13, wherein
the first filler of the plurality of fillers is independent of the second filler of the plurality of fillers,
the first filler is between the first projecting portion of the plurality of projecting portions and the pressed body,
the second filler is between the second projecting portion of the plurality of projecting portions and the pressed body.

17. The electronic equipment of claim 13, wherein each of the plurality of projecting portions corresponds to one of the plurality of sensing sections.

18. The electronic equipment of claim 13, wherein
the pressure-sensitive sensor includes an elastic layer, and
the elastic layer is between the first reference electrode layer and the plurality of sensing sections.

19. The electronic equipment of claim 18, wherein
the plurality of projecting portions is different from the elastic layer, and
an elastic modulus of the plurality of projecting portions is higher than an elastic modulus of the elastic layer.

20. An input apparatus, comprising:
a pressed body, wherein the pressed body is one of a housing or a display;
a pressure-sensitive sensor, wherein
the pressure-sensitive sensor includes a plurality of sensing sections, a first reference electrode layer, and a second reference electrode layer, and
the plurality of sensing sections is between the first reference electrode layer and the second reference electrode layer;
a support configured to support the pressure-sensitive sensor such that the pressure-sensitive sensor is opposed to the pressed body;
a plurality of projecting portions in direct contact with a face of the pressure-sensitive sensor, wherein
the face of the pressure-sensitive sensor is opposite to the pressed body,
the first reference electrode layer is between the plurality of projecting portions and the plurality of sensing sections,
each of the plurality of projecting portions corresponds to one of the plurality of sensing sections, and
a height of a first projecting portion of the plurality of projecting portions is different from a height of a second projecting portion of the plurality of projecting portions; and
a filler that includes a first surface and a second surface opposite to the first surface, wherein
the first surface of the filler is in direct contact with the pressed body,
and
a thickness of the filler corresponding to the first projecting portion is different from the thickness of the filler corresponding to the second projecting portion such that the second surface of the filler is in direct contact with each of the first projecting portion and the second projecting portion.

21. An input apparatus, comprising:
a pressed body, wherein the pressed body is one of a housing or a display;
a pressure-sensitive sensor, wherein the pressure-sensitive sensor includes a plurality of sensing sections, a first reference electrode layer, and a second reference electrode layer, and the plurality of sensing sections is between the first reference electrode layer and the second reference electrode layer;

a plurality of projecting portions in direct contact with a face of the pressure-sensitive sensor, wherein the face of the pressure-sensitive sensor is opposite to the pressed body, the first reference electrode layer is between the plurality of projecting portions and the plurality of sensing sections, and a height of a first projecting portion of the plurality of projecting portions is different from a height of a second projecting portion of the plurality of projecting portions;

a support configured to support the pressure-sensitive sensor such that the pressure-sensitive sensor is opposed to the pressed body; and a plurality of fillers that includes a first surface and a second surface opposite to the first surface, wherein the first surface of the plurality of fillers is in direct contact with the pressed body, and a thickness of a first filler of the plurality of fillers corresponding to the first projecting portion is different from a thickness of a second filler of the plurality of fillers corresponding to the second projecting portion, such that the second surface of the first filler is in direct contact with the first projecting portion, and the second surface of the second filler is in direct contact with the second projecting portion.

\* \* \* \* \*